(12) United States Patent
Kim et al.

(10) Patent No.: US 12,068,613 B2
(45) Date of Patent: Aug. 20, 2024

(54) ELECTRONIC DEVICE AND METHOD FOR INCREASING POWER SUPPLY EFFICIENCY OF WIRELESS CHARGING CIRCUIT

(71) Applicant: SAMSUNG ELECTRONICS CO., LTD., Suwon-si (KR)

(72) Inventors: Yusu Kim, Suwon-si (KR); Yongsang Yun, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 87 days.

(21) Appl. No.: 17/885,336

(22) Filed: Aug. 10, 2022

(65) Prior Publication Data

US 2023/0137959 A1 May 4, 2023

Related U.S. Application Data

(63) Continuation of application No. PCT/KR2022/010400, filed on Jul. 15, 2022.

(30) Foreign Application Priority Data

Oct. 28, 2021 (KR) .......................... 10-2021-0145725
Jun. 2, 2022 (KR) .......................... 10-2022-0067681

(51) Int. Cl.
*H02J 50/80* (2016.01)
*H02J 7/00* (2006.01)
(Continued)

(52) U.S. Cl.
CPC ............ *H02J 50/10* (2016.02); *H02J 7/0013* (2013.01); *H02J 7/007* (2013.01); *H02J 7/342* (2020.01);
(Continued)

(58) Field of Classification Search
CPC .... H02J 7/00034; H02J 7/0013; H02J 7/0068; H02J 7/007; H02J 7/34; H02J 7/342;
(Continued)

(56) References Cited

U.S. PATENT DOCUMENTS 11,025,082 B2 6/2021 Lee et al.
2007/0279002 A1 12/2007 Partovi
(Continued)

FOREIGN PATENT DOCUMENTS

CN 113507145 A 10/2021
JP 6242897 B2 11/2017
(Continued)

OTHER PUBLICATIONS

International Search Report and Written Opinion for International Application No. PCT/KR2022/010400; International Filing Date Jul. 15, 2022; Date of Mailing, Oct. 25, 2022; 10 pages.

*Primary Examiner* — Levi Gannon
(74) *Attorney, Agent, or Firm* — CANTOR COLBURN LLP

(57) ABSTRACT

Various embodiments of the disclosure relate to an electronic device and method that increases the efficiency of power supplying of a wireless charging circuit. The processor may perform a wireless power sharing function, may identify the type of an external device aligned with a coil of the electronic device, may supply a designated first power to a wireless charging integrated circuit of the electronic device in the case in which the external device is a first device, the first device being a device that requests a voltage higher than a reference voltage level, may control the wireless charging IC to generate a current of the coil based on the first power, may activate a path that directly connects a battery of the electronic device and the wireless charging IC, and may (Continued)

supply a second power lower than the first power to the wireless charging IC via the path.

10 Claims, 13 Drawing Sheets

(51) Int. Cl.
*H02J 7/34* (2006.01)
*H02J 50/10* (2016.01)

(52) U.S. Cl.
CPC ........... *H02J 50/80* (2016.02); *H02J 2207/20* (2020.01); *H02J 2207/40* (2020.01)

(58) Field of Classification Search
CPC .. H02J 50/10; H02J 50/12; H02J 50/80; H02J 50/90; H02J 2207/20; H02J 2207/40
See application file for complete search history.

(56) References Cited

U.S. PATENT DOCUMENTS

| | | | |
|---|---|---|---|
| 2014/0091623 A1 | 4/2014 | Shippy et al. | |
| 2016/0079767 A1 | 3/2016 | Hatanaka et al. | |
| 2017/0005494 A1* | 1/2017 | Li | H02J 7/0013 |
| 2017/0126041 A1 | 5/2017 | Sato | |
| 2019/0148968 A1* | 5/2019 | Kim | H04B 5/0056 |
| | | | 320/108 |
| 2019/0260218 A1* | 8/2019 | Tian | H02M 1/08 |
| 2020/0119581 A1* | 4/2020 | Kim | H02J 7/0068 |
| 2020/0136421 A1* | 4/2020 | Kim | H02J 7/342 |
| 2020/0266667 A1 | 8/2020 | Lee et al. | |
| 2020/0266674 A1 | 8/2020 | Lee et al. | |
| 2022/0368159 A1 | 11/2022 | Mohammadabadi et al. | |
| 2023/0138849 A1* | 5/2023 | Im | H02J 7/00032 |
| | | | 307/112 |

FOREIGN PATENT DOCUMENTS

| | | |
|---|---|---|
| KR | 101673353 B1 | 11/2016 |
| KR | 101999520 B1 | 9/2019 |
| KR | 20200042376 A | 4/2020 |
| KR | 20200063558 A | 6/2020 |
| KR | 20200101225 A | 8/2020 |
| KR | 20200101228 A | 8/2020 |
| KR | 102154779 B1 | 9/2020 |
| KR | 20210054172 A | 5/2021 |
| WO | 2010129369 A2 | 11/2010 |
| WO | 2016013451 A1 | 1/2016 |
| WO | 2020185877 A1 | 9/2020 |

* cited by examiner

ELECTRONIC DEVICE AND METHOD FOR INCREASING POWER SUPPLY EFFICIENCY OF WIRELESS CHARGING CIRCUIT

CROSS-REFERENCE TO RELATED APPLICATIONS

This application is based on and claims priority under 35 U.S.C. § 120 to PCT International Application No. PCT/KR2022/010400, which was filed on Jul. 15, 2022, and claims priority to Korean Patent Application No. 10-2022-0067681 filed on Jun. 2, 2022, and Korean Patent Application No. 10-2021-0145725 filed on Oct. 28, 2021, in the Korean Intellectual Property Office, the disclosure of which are incorporated by reference herein their entirety.

TECHNICAL FIELD

Various embodiments of the disclosure relate to an electronic device that increases the efficiency of a power supply of a wireless charging circuit in the state of being connected to a wired charging unit, and a method therefor.

BACKGROUND ART

Recently, wireless charging or noncontact charging technology has been developed and is being applied to various element devices.

Wireless charging technology is technology that is capable of charging a battery without connection to a wired charging unit and is capable of charging a battery by a user merely putting an electronic device such as a smartphone or a wearable device on a charging pad or a charging cradle.

DISCLOSURE OF INVENTION

Technical Problem

An electronic device to which a wireless charging circuit is applied may receive power input from an external device via a coil and may charge a battery using the input power. Such electronic device may provide a wireless power sharing function (e.g., wireless power share) that supplies, based on the power of the battery, wireless power to another electronic device. For example, when the wireless power sharing function is activated, the electronic device may generate a designated power using the power of the battery and may supply the generated power to the other electronic device (e.g., a smartphone, a smart watch, or wireless earphones (e.g., true wireless stereo)) via the coil.

When connected to a wired charging unit, the electronic device to which the wireless charging circuit is applied may charge the battery based on power input from the wired charging unit, and may perform a wireless power sharing function based on the power input from the wired charging unit. For example, the electronic device may charge the battery based on power input from the wired charging unit and, simultaneously, may output a designated power for supplying the other electronic device (e.g., a smartphone, a smart watch, or wireless earphones (e.g., true wireless stereo)) via the coil.

According to various embodiments, there is provided an electronic device and method that may substantially increase the efficiency of wireless charging (e.g., a charging speed) and may substantially decrease generated heat by adjusting the operating voltage of a wireless charging IC in consideration of the type of another electronic device (e.g., a smartphone, a smart watch, or wireless earphones (e.g., true wireless stereo)) that receives a wireless power shared and/or charging state (e.g., a constant current (CC) mode or a constant voltage (CV) mode) when a wireless power sharing function is activated.

According to various embodiments, there is provided an electronic device and method that may receive power from a wired charging unit and may supply the power to a battery and/or a system, and may supply at least part of the received power to another electronic device (e.g., wireless earphones, a smart watch) in a wireless manner. The technical subject matter of the disclosure is not limited to the above-mentioned technical subject matter, and other technical subject matters which are not mentioned may be understood by those skilled in the art based on the following description.

Solution to Problem

An electronic device according to various embodiments may include a first battery, a wireless interface including a coil, a wireless charging integrated circuit (IC) electrically connected to the coil, a universal serial bus (USB) interface configured to be connected to a wired charging unit, a first charger, a second charger including a power converter configured to output an input current supplied from the wired charging unit by increasing at a designated magnification and to output an input voltage supplied from the wired charging unit by decreasing at the designated magnification, and a processor, and the processor may be configured to cause a wireless power sharing function to be performed that supplies wireless power to an external device including a second battery via the wireless interface, to identify, based on the performing of the wireless power sharing function, a type of the external device aligned with the coil, to cause a first power to be supplied to the wireless charging IC responsive to determining that the external device is a first device, the first device being a device that requests a voltage higher than a reference voltage level in order to charge the second battery, to control the wireless charging IC to generate a current of the coil based on the first power, to activate a path that directly connects the first battery and the wireless charging IC responsive to determining that the external device is in the state of charging the second battery in a constant voltage (CV) mode while the first power is provided to the wireless charging IC, and to supply a second power lower than the first power to the wireless charging IC via the path.

A method of an electronic device including a first battery according to various embodiments may include an operation of performing a wireless power sharing function that supplies wireless power to an external device including a second battery via a wireless interface, an operation of identifying a type of the external device aligned with a coil of the wireless interface responsive to the performing the wireless power sharing function, an operation of supplying a designated first power to a wireless charging IC connected to the wireless interface responsive to the external device being a first device, the first device being a device that requests a voltage higher than a reference voltage level in order to charge the second battery, an operation of controlling the wireless charging IC to generate, based on the first power, a current of the coil, an operation of activating a path that directly connects the first battery and the wireless charging IC responsive to determining that the external device is in the state of charging the second battery in a constant voltage (CV) mode while the first power is provided to the wireless charging IC, and an operation of supplying a second power lower than the first power to the wireless charging IC via the path.

An electronic device according to various embodiments may include a first battery, a wireless interface including a coil, a wireless charging IC electrically connected to the coil, a USB interface configured to be connected to a wired charging unit, a first charger, a second charger including a power converter configured to output an input current supplied from the wired charging unit by increasing at a designated magnification, and to output an input voltage supplied from the wired charging unit by decreasing at the designated magnification, and a processor, and the processor may be configured to receive a first voltage from the wired charging unit via the USB interface, to cause the first battery to be charged by supplying the first voltage to the first battery via the to the first charger or the second charger, to cause a wireless power sharing function to be performed that supplies wireless power to an external device including a second battery via the wireless interface while charging the first battery, to identify a type of the external device aligned with the coil based on the performing of the wireless power sharing function, to determine a second voltage based on whether the type of the external device is a first device or a second device, and to control the wireless charging IC to generate a current of the coil based on the second voltage, and the second voltage is a voltage lower than the first voltage.

A method of the electronic device including a first battery according to various embodiments may include an operation of performing, by an electronic device, a wireless power sharing function, an operation of identifying a type of an external device aligned with a coil of a wireless interface associated with a wireless interface integrated circuit (IC) of the electronic device, an operation of determining whether the external device aligned with the coil is a relatively high-voltage device or a relatively low-voltage device, the relatively high-voltage device accepting a higher voltage than the relatively low-voltage device, an operation of responsive to determining that the external device aligned with the coil is a relatively high-voltage device, supplying first power from a first charging circuit of the electronic device to the wireless interface IC while the external device is not in a constant voltage (CV) mode, and an operation of responsive to the relatively high-voltage device not being in the CV mode or responsive to determining that the external device is a relatively low-voltage device, activating a path of a circuit that directly connects a battery of the electronic device to the wireless charging IC and supplying second power to the wireless charging IC via the path Advantageous Effects of Invention According to various embodiments, there is provided an electronic device and method that can substantially increase the efficiency of wireless charging and can substantially decrease heat generated from the electronic device and/or external device by adjusting the operating voltage of a wireless charging IC in consideration of the type of another electronic device (e.g., a smartphone, a smart watch, or wireless earphones (e.g., true wireless stereo)) that receives a wireless power shared and/or a charging state (e.g., a constant current (CC) mode or a constant voltage (CV) mode) when a wireless power sharing function is activated.

According to various embodiments of the disclosure, there is provided an electronic device and method that can receive power from a wired charging unit and can supply the power to a battery and/or a system and can supply at least part of the received power to another electronic device (e.g., wireless earphones, a smart watch) in a wireless manner.

In addition, various effects directly or indirectly recognized from the disclosure can be provided.

BRIEF DESCRIPTION OF DRAWINGS

The other aspects, features, and advantages of a predetermined embodiment of the disclosure will be more apparent from the following detailed description taken in conjunction with the accompanying drawings, in which.

MODE FOR THE INVENTION

Figure 1:
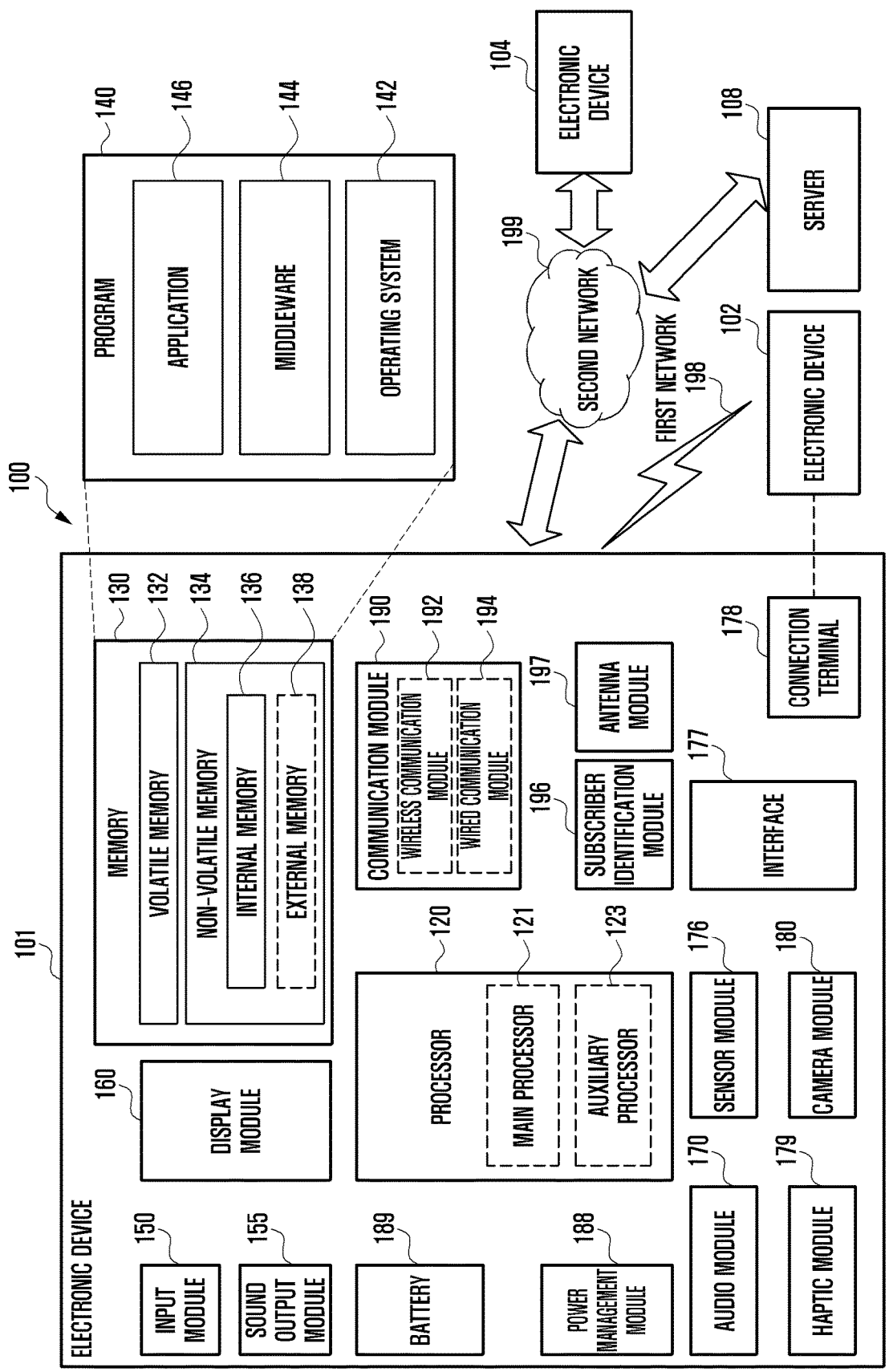
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
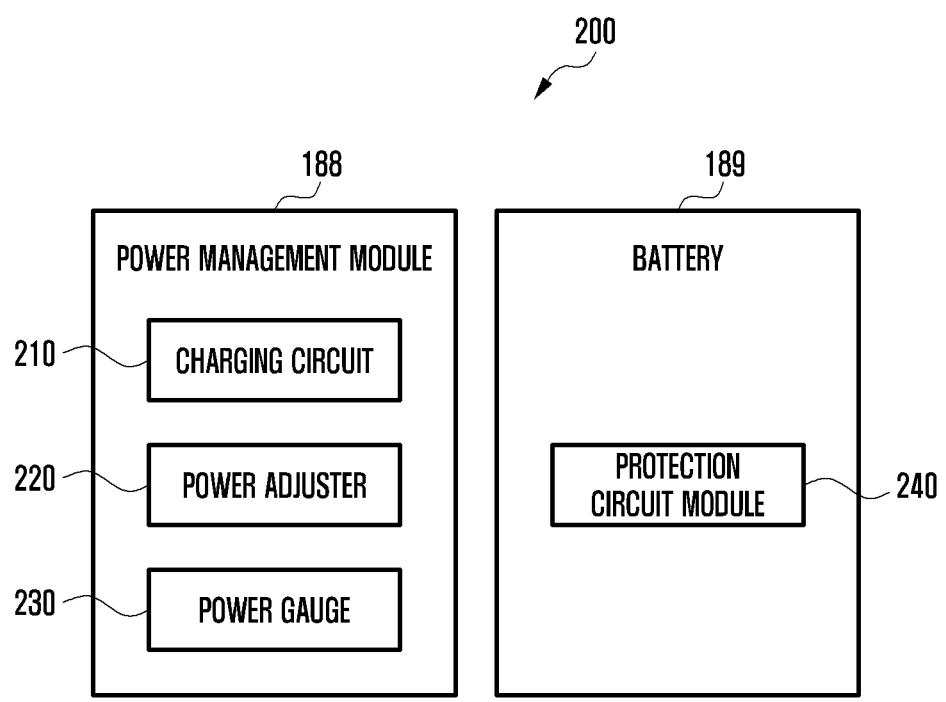
FIG. 2 is a block diagram illustrating a power management module and a battery according to various embodiments.

FIG. 2 is a block diagram 200 illustrating the power management module 188 and the battery 189 according to various embodiments. Referring to FIG. 2, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

Figure 3:
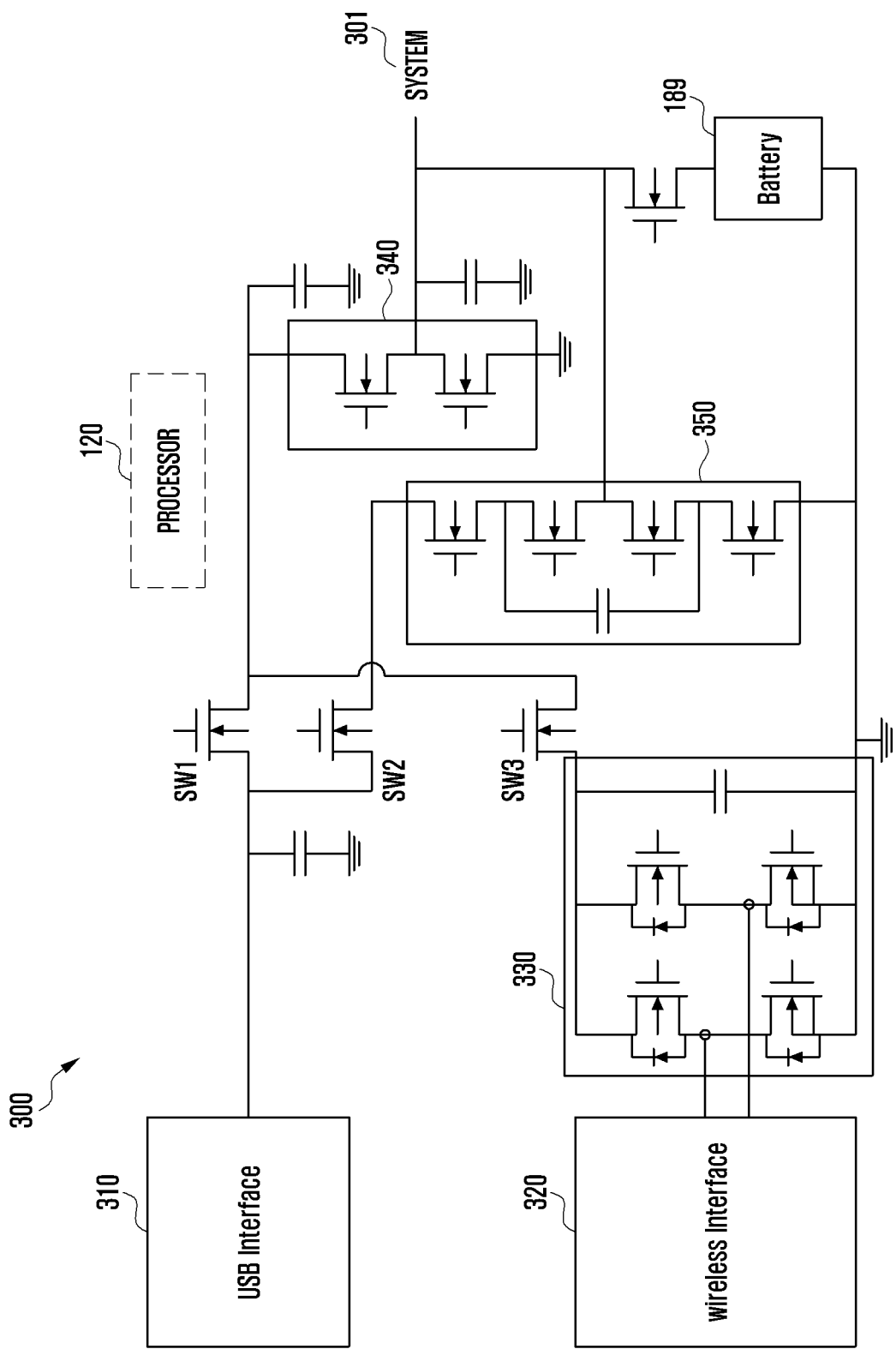
FIG. 3 is a block diagram illustrating an electronic device including a wireless charging circuit according to an embodiment.

FIG. 3 is a block diagram illustrating an electronic device 300 including a wireless charging circuit according to an embodiment.

Referring to FIG. 3, the electronic device 300 according to an embodiment may include the first battery 189, a first charger 340 and a second charger 350 for charging the first battery 189, a wireless charging IC 330, a USB interface 310 electrically connected to the first charger 340 and the second charger 350, and/or a wireless interface 320 including a coil (not illustrated) electrically connected to the wireless charging IC 330.

According to an embodiment, the USB interface 310 may include a USB communication module (e.g., a CCPD (configuration channel power delivery) module). For example, the USB interface 310 may be connected to a wired charging unit via a CC terminal (not illustrated) of an USB type-C, and may perform a type C detection function that identifies an Rp value via the CC terminal, PD bi-phase marked code (PD BMC) communication, or programmable power supply (PPS) communication.

According to an embodiment, a first switch (SW1) may be disposed between the USB interface 310 and the first charger 340. The first switch (SW1) may switch on or off the electrical connection between the USB interface 310 and the first charger 340.

According to an embodiment, a second switch (SW2) may be disposed between the USB interface 310 and the second charger 350. The second switch (SW2) may switch on or off the electrical connection between the USB interface 310 and the second charger 350.

According to an embodiment, the processor 120 may identify the type of wired charging unit when a wired charging unit is connected. The processor 120 may identify whether the connected wired charging unit is a PPS charging unit that is capable of varying an output current and an output voltage. Based on the control performed by the electronic device 300, the PPS charging unit may adjust an output voltage in the range of approximately 3V to approximately 21V. The PPS charging unit may supply an output voltage falling within a range designated for an electronic device that supports direct charging (hereinafter "DC charging") of a switched capacitor (cap) divider scheme, and herein the output voltage in the designated range may be the range of approximately 3V to approximately 21V. The PPS charging unit may adjust an output voltage to fall within the range of approximately 3V to approximately 21V and may supply the adjusted output voltage to an electronic device.

In the disclosure, the "PPS charging unit" may be a "charging unit that supports a PPS function".

According to an embodiment, in the case in which the connected wired charging unit is a PPS charging unit, the processor 120 may turn on the second switch (SW2) so as to electrically connect the USB interface 310 and the second charger 350. The processor 120 may activate the second charger 350 via the electrical connection between the USB interface 310 and the second charger 350, and may charge the first battery 189 using the second charger 350.

According to an embodiment, a regulator (not illustrated) electrically connected to the second charger 350 and the first battery 189 may include, for example, a low dropout (LDO) regulator. The second charger 350 may decrease a first voltage (e.g., approximately 9V) supplied from the USB interface 310 to a second voltage (e.g., approximately 4.5

V), and the regulator may decrease the second voltage to a third voltage (e.g., approximately 4.2 V).

According to an embodiment, in the case in which the connected wired charging unit is not a PPS charging unit, the processor 120 may turn on the first switch (SW1) so as to electrically connect the USB interface 310 and the first charger 340. The processor 120 may activate the first charger 340 via the electrical connection between the USB interface 310 and the first charger 340, and may charge the first battery 189 using the first charger 340. A charging unit that is not a PPS charging unit may include, for example, a charging unit (e.g., hereinafter a "first charging unit") that provides a fixed output voltage of approximately 9V and/or approximately 5V, a charging unit (hereinafter, a "second charging unit") that provides an output voltage in the range of approximately 3.5V to approximately 22V, or a charging unit (hereinafter, a "third charging unit") that provides a fixed output voltage of approximately 5V.

According to an embodiment, the wireless charging IC 330 may be electrically connected to a coil (not illustrated) of the wireless interface 320, and may include a plurality of switching devices of a full bridge inverter.

According to an embodiment, a third switch (SW3) may be disposed between the first charger 340 and the wireless charging IC 330. The third switch (SW3) may switch on or off the electrical connection between the first charger 340 and the wireless charging IC 330. According to an embodiment, the processor 120 may turn on the third switch (SW3) when a wireless power sharing function is activated (or performed) that supplies wireless power to an external device via a coil (not illustrated) using the voltage of the first battery 189 or power input from a wired charging unit. When the wireless power sharing function is activated, the processor 120 may perform control so as to provide a designated voltage to the wireless charging IC 330. Based on a designated voltage obtained from the first charger 340, the wireless charging IC 330 may generate a current of a coil, and may supply wireless power to an external device.

According to an embodiment, each of the first switch (SW1), the second switch (SW2), and the third switch (SW3) may include a metal-oxide semiconductor field effect transistor (MOSFET).

According to an embodiment, the first battery 189 may supply power for driving the electronic device 300 by providing a designated voltage to a system 301. According to an embodiment, a PMIC, which is not illustrated, may be disposed between the first battery 189 and the system 301.

According to an embodiment, the first charger 340 may include a buck-boost converter (not illustrated) and a switching charger (or a switching regulator) including a charging controller (not illustrated), and may charge the first battery 189 by adjusting an input voltage or an input current input from a wired charging unit via the USB interface 310.

According to an embodiment, the second charger 350 may be a direct charger that supports direct charging (hereinafter "DC charging") of a switched capacitor (cap) divider scheme. According to an embodiment, the second charger 350 may include a power converter that decreases an input voltage input from a wired charging unit at a designated magnification and that increases an input current input from the wired charging unit at a designated magnification. According to an embodiment, the second charger 350 may include a 2:1 voltage divider that decreases an input voltage to approximately ½ and increases an input current to approximately double the amount. According to various embodiments, the disclosure is not limited to the example in which the second charger 350 includes the 2:1 voltage divider. The design of the second charger 350 may be variously modified such as to include a 3:1 voltage divider that decreases an input voltage to approximately ⅓ and increases an input current approximately three times, or to include a 4:1 voltage divider that decreases an input voltage to approximately ¼ and increases an input current approximately four times, and the like.

Figure 4:
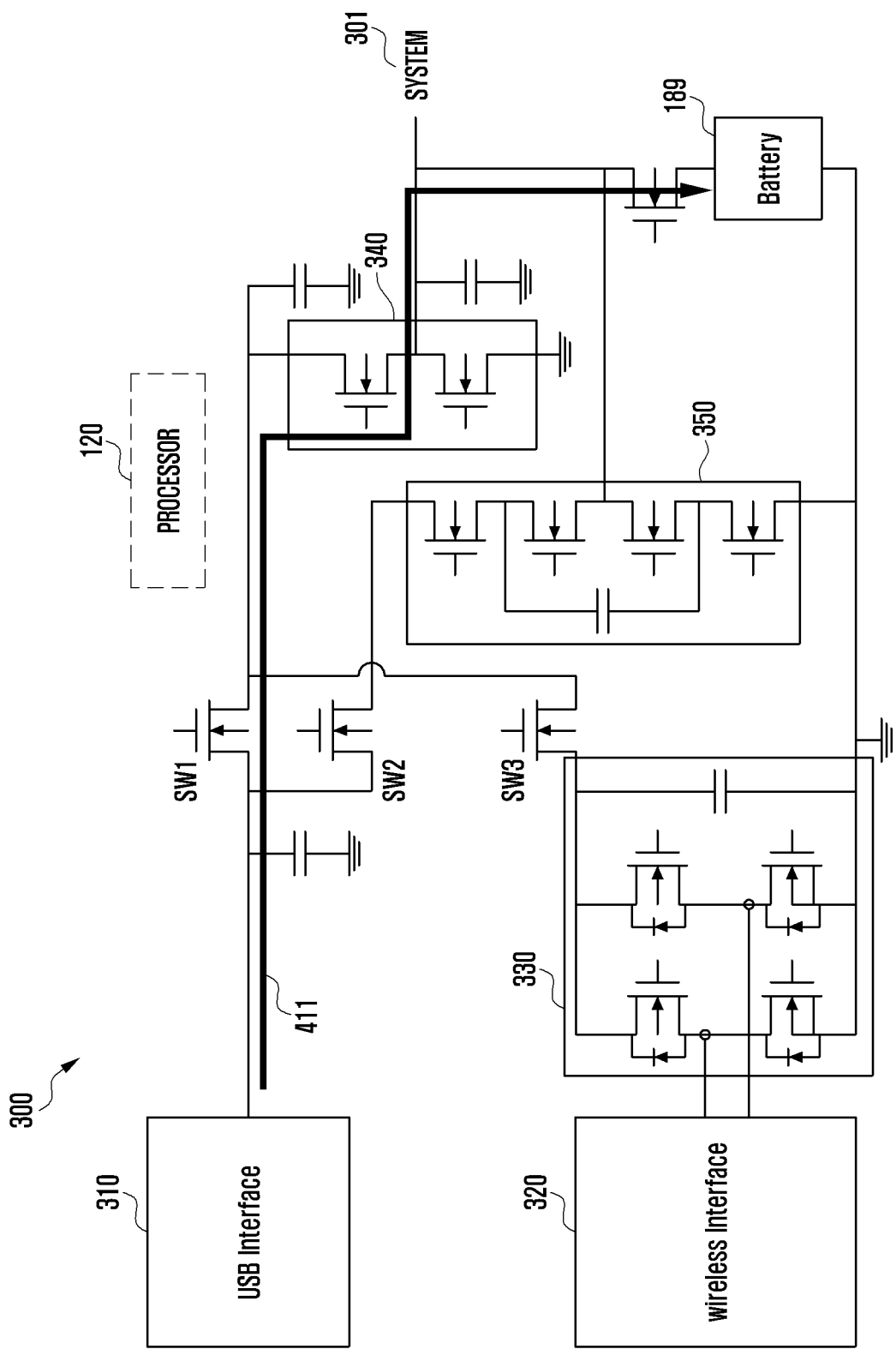
FIG. 4 is a diagram illustrating the state in which a wired charging unit is connected to an electronic device according to the embodiment of FIG. 3.

FIG. 4 is a diagram illustrating the state in which a wired charging unit is connected to the electronic device 300 according to the embodiment of FIG. 3.

Figure 5:
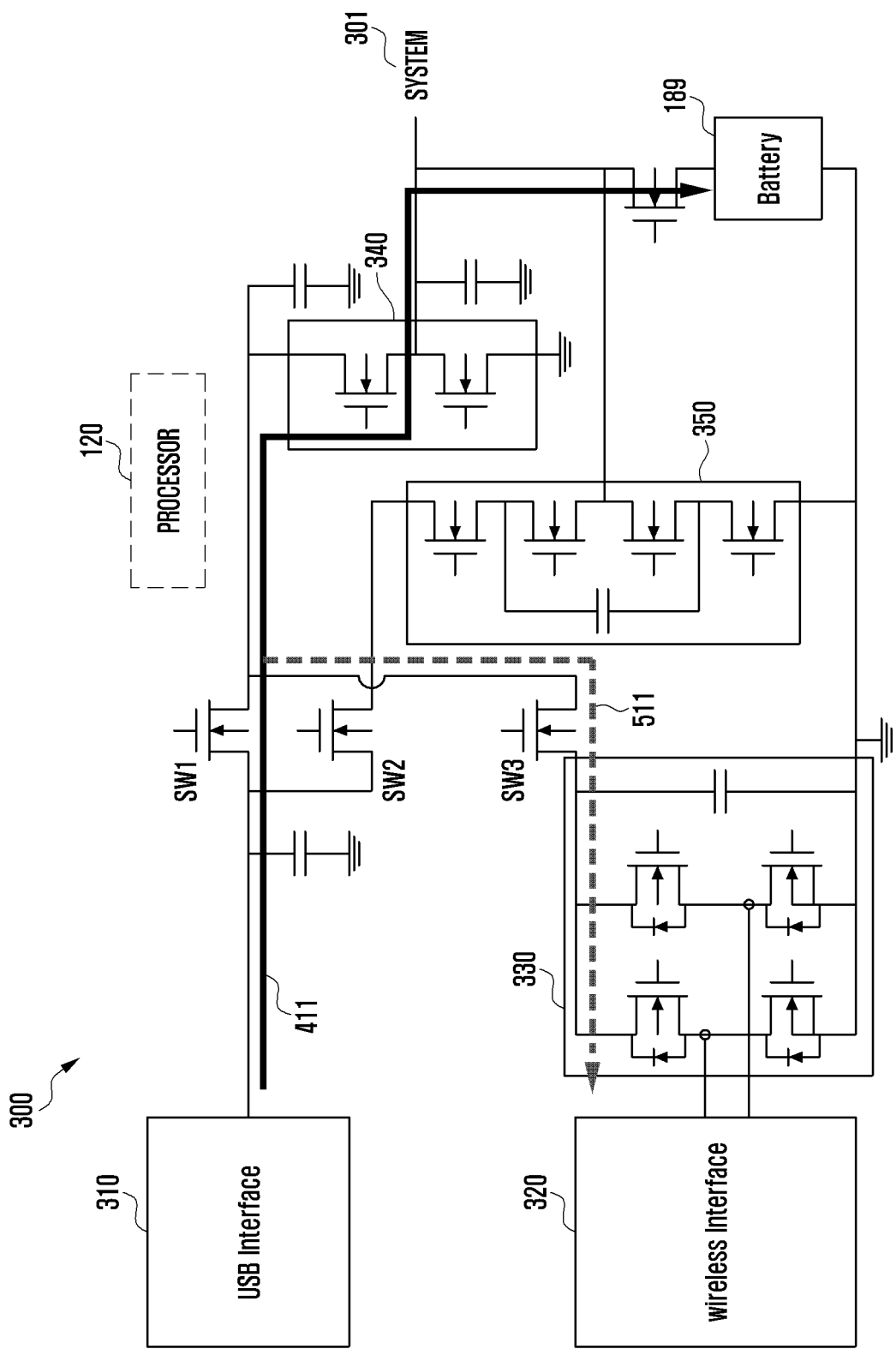
FIG. 5 is a diagram illustrating the state in which a wired charging unit is connected to an electronic device and, simultaneously, a wireless power sharing function is performed according to the embodiment of FIG. 3.

FIG. 5 is a diagram illustrating the state in which a wired charging unit is connected to the electronic device 300 and, simultaneously, a wireless power sharing function is performed according to the embodiment of FIG. 3.

Referring to FIG. 4, the processor 120 according to an embodiment may identify the type of wired charging unit when a wired charging unit is connected to the electronic device 300. According to an embodiment, in the case in which the connected wired charging unit is not a PPS charging unit, the processor 120 may turn on a first switch (SW1) so as to electrically connect the USB interface 310 and the first charger 340, as shown by an arrow 411 of FIG. 4.

For example, in the case in which a charging unit different from the PPS charging unit, for example, a quick charging unit (e.g., a first charging unit or a second charging unit) or a normal charging unit (e.g., a third charging unit), is connected to the electronic device 300, the processor 120 may turn on the first switch (SW1) so as to electrically connect the USB interface 310 and the first charger 340, as shown by the arrow 411 of FIG. 4. According to an embodiment, the processor 120 may activate the first charger 340 via the electrical connection between the USB interface 310 and the first charger 340, and may charge the first battery 189 using the first charger 340.

Referring to FIG. 5, the processor 120 according to an embodiment may perform a wireless power sharing function while charging the first battery 189 using the first charger 340. For example, the processor 120 may provide a user interface, which is not illustrated, via a display (e.g., the display module 160 of FIG. 1), and may perform a wireless power sharing function based on a user input via the user interface. According to an embodiment, the processor 120 may perform a wireless power sharing function based on a user input provided via a physical button (not illustrated) disposed in a part of the housing (not illustrated) of the electronic device 300. According to an embodiment, the processor 120 may perform a wireless power sharing function based on one of the various user inputs or various events (e.g., events based on wireless communication) in addition to the above-mentioned embodiments.

According to an embodiment, the processor 120 may turn on a third switch (SW3) so as to establish a path that electrically connects the wireless charging IC 330 and the first charger 340, as shown by an arrow 511 of FIG. 5. The processor 120 may receive power from a wired charging unit via the USB interface 310, and may control the electronic device 300 to supply the received power to the wireless charging IC 330. The processor 120 may control the electronic device 300 so as to provide a designated voltage to the wireless charging IC 330. For example, the processor 120 may request and/or control the wired charging unit to change an output power (a voltage and/or current). In the case in which a wired charging unit is not connected, the processor 120 may control the electronic device 300 so as to supply a designated voltage to the wireless charging IC 330 by performing control so that the first charger 340 operates in a boost mode. The wireless charging IC 330 may generate a current of a coil based on a designated voltage obtained from the first charger 340, and may supply wireless power to an external device. In this instance, the voltage provided to the wireless charging IC 330 may be determined based on a voltage input from the wired charging unit. For example, in the case in which the wired charging unit is a quick charging unit (e.g., a first charging unit) that provides a voltage of approximately 9V, a voltage provided to the wireless charging IC 330 may be approximately 9V. For example, in the case in which the wired charging unit is a normal charging unit (e.g., a third charging unit) that provides a voltage of approximately 5V, a voltage provided to the wireless charging IC 330 may be approximately 5V. For example, in the case in which a normal charging unit (e.g., the third charging unit) that provides a voltage of approximately 5V is connected as the wired charging unit, the processor 120 may alternately perform an operation of charging the first battery 189 by supplying the voltage of approximately 5V input from the wired charging unit to the first charger 340 and an operation of performing a wireless power sharing function by supplying, to the wireless charging IC 330, the voltage of approximately 5V input from the wired charging unit.

According to an embodiment, the processor 120 may obtain a first power (e.g., approximately 15 W, approximately 9V/1.67 A) using the first charger 340 from a wired charging unit connected to the USB interface 310 and may control the electronic device 300 so as to supply the obtained first power to the first battery 189 and/or the system 301. In the state of supplying the first power to the first battery 189 and/or the system 301, the processor 120 may determine whether a wireless power sharing function is activated that shares power with another electronic device in a wireless manner. The processor 120 may determine (or identify) the type of another electronic device and a charging state. At least based on the determinations, the processor 120 may determine power (a voltage and/or a current) to be supplied to the wireless charging IC 330. For example, based on the type of another electronic device and a charging state, the processor 120 may determine a second power (e.g., approximately 5 W, approximately 5V/1 A) lower than the first power (e.g., approximately 15 W, approximately 9V/1.67 A) to the first battery 189, the system 301, and/or the wireless charging IC 330. In the above-description, the power value, voltage value, and/or current value of the first power (e.g., approximately 15 W, approximately 9V/1.67 A) is merely an example, and the embodiments described herein are not limited to those numeral values. The power value, voltage value, and/or a current value of the second power (e.g., approximately 5 W, approximately 5V/1 A) is merely an example, and the embodiments described herein are not limited to those numeral values.

Figure 6:
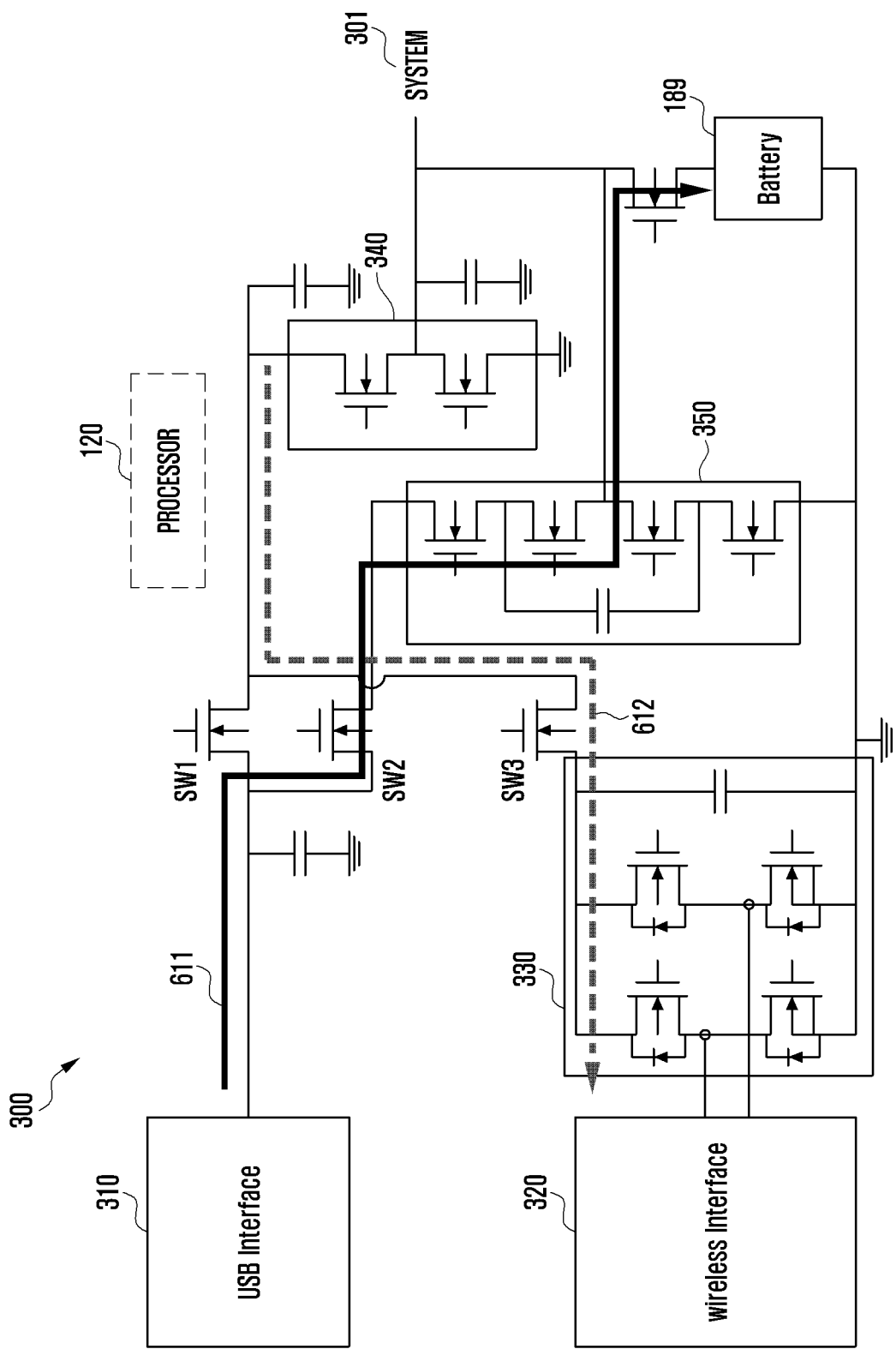
FIG. 6 is a diagram illustrating the state in which a wired charging unit that supports a programmable power supply (PPS) function is connected to an electronic device and, simultaneously, a wireless power sharing function is performed according to the embodiment of FIG. 3.

FIG. 6 is a diagram illustrating the state in which a wired charging unit that supports a PPS function is connected to the electronic device 300 and, simultaneously, a wireless power sharing function is performed according to the embodiment of FIG. 3.

Referring to FIG. 6, the processor 120 according to an embodiment may identify the type of wired charging unit when a wired charging unit is connected to the electronic device 300. According to an embodiment, in the case in which a connected wired charging unit is a PPS charging unit, the processor 120 may turn on a second switch (SW2) so as to electrically connect the USB interface 310 and the second charger 350, as shown by an arrow 611 of FIG. 6. According to an embodiment, the processor 120 may activate the second charger 350 via the electrical connection between the USB interface 310 and the second charger 350, and may charge the first battery 189 using the second charger 350.

According to an embodiment, the second charger 350 may charge the first battery 189 by performing power conversion that decreases an input voltage input from the wired charging unit at a designated magnification and increases an input current input from the wired charging unit at a designated magnification.

According to an embodiment, the processor 120 may perform a wireless power sharing function while charging the first battery 189 using the second charger 350. When the wireless power sharing function is performed, the processor 120 may turn on a third switch (SW3) so as to establish a path that electrically connects the wireless charging IC 330 and the first charger 340 as shown by an arrow 612 of FIG. 6. The processor 120 may perform control so as to provide a designated voltage to the wireless charging IC 330 by performing control so that the first charger 340 operates in a reverse boost mode. The wireless charging IC 330 may generate a current of a coil based on a designated voltage obtained from the first charger 340, and may supply wireless power to an external device.

Figure 7:
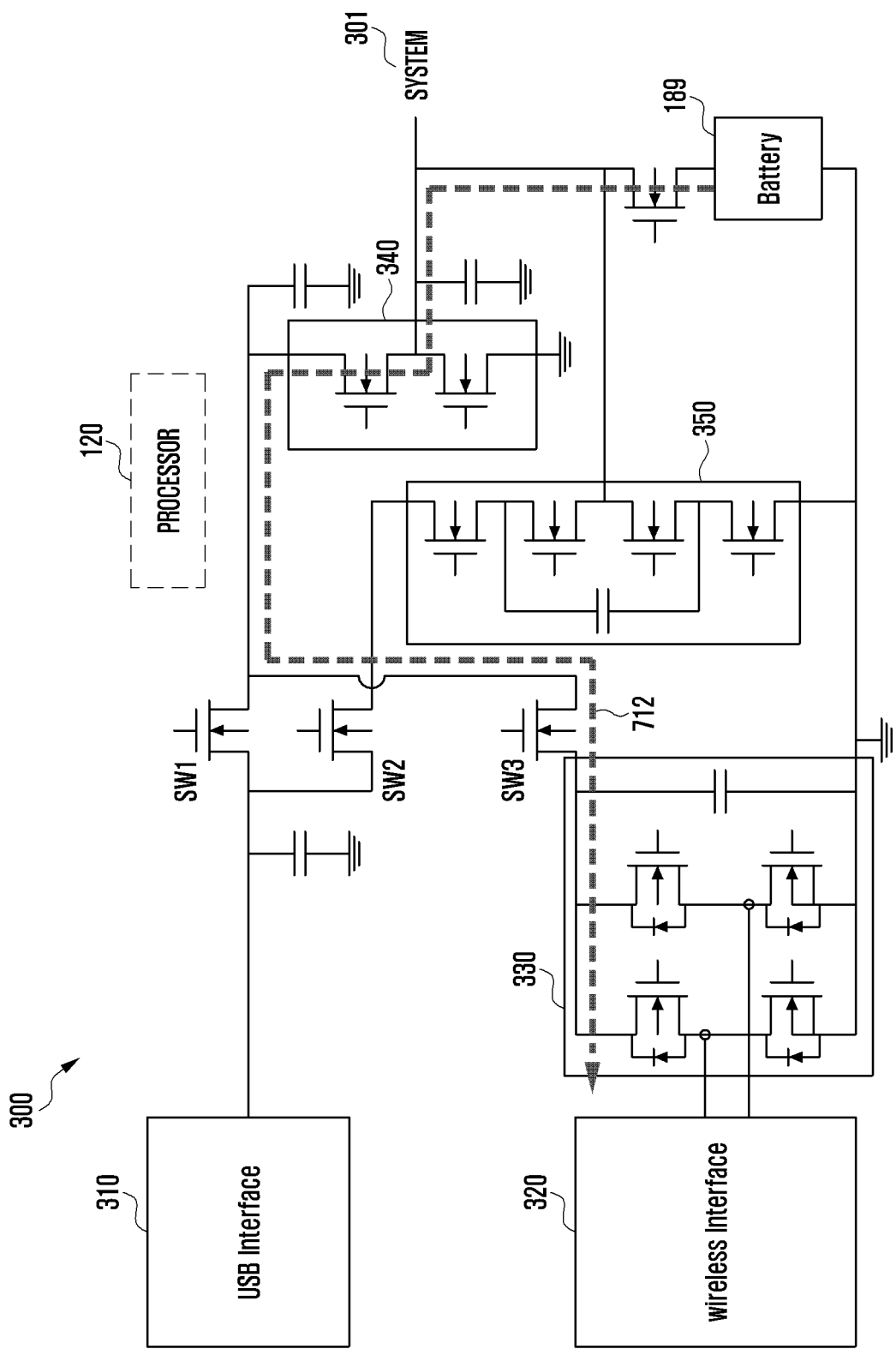
FIG. 7 is a diagram illustrating the state in which a wired charging unit is not connected to an electronic device and a wireless power sharing function is performed according to the embodiment of FIG. 3.

FIG. 7 is a diagram illustrating the state in which a wired charging unit is not connected to the electronic device 300 and a wireless power sharing function is performed according to the embodiment of FIG. 3.

Referring to FIG. 7, the processor 120 according to an embodiment may perform a wireless power sharing function in the state in which a wired charging unit is not connected. According to an embodiment, when the wireless power sharing function is performed, the processor 120 may turn on the third switch (SW3) so as to establish a path that electrically connects the wireless charging IC 330 and the first charger 340, as shown by an arrow 712 of FIG. 7. The processor 120 may perform control so as to provide a designated voltage to the wireless charging IC 330 by performing control so that the first charger 340 operates in a reverse boost mode. The wireless charging IC 330 may generate a current of a coil based on a designated voltage obtained from the first charger 340, and may supply wireless power to an external device.

Figure 8:
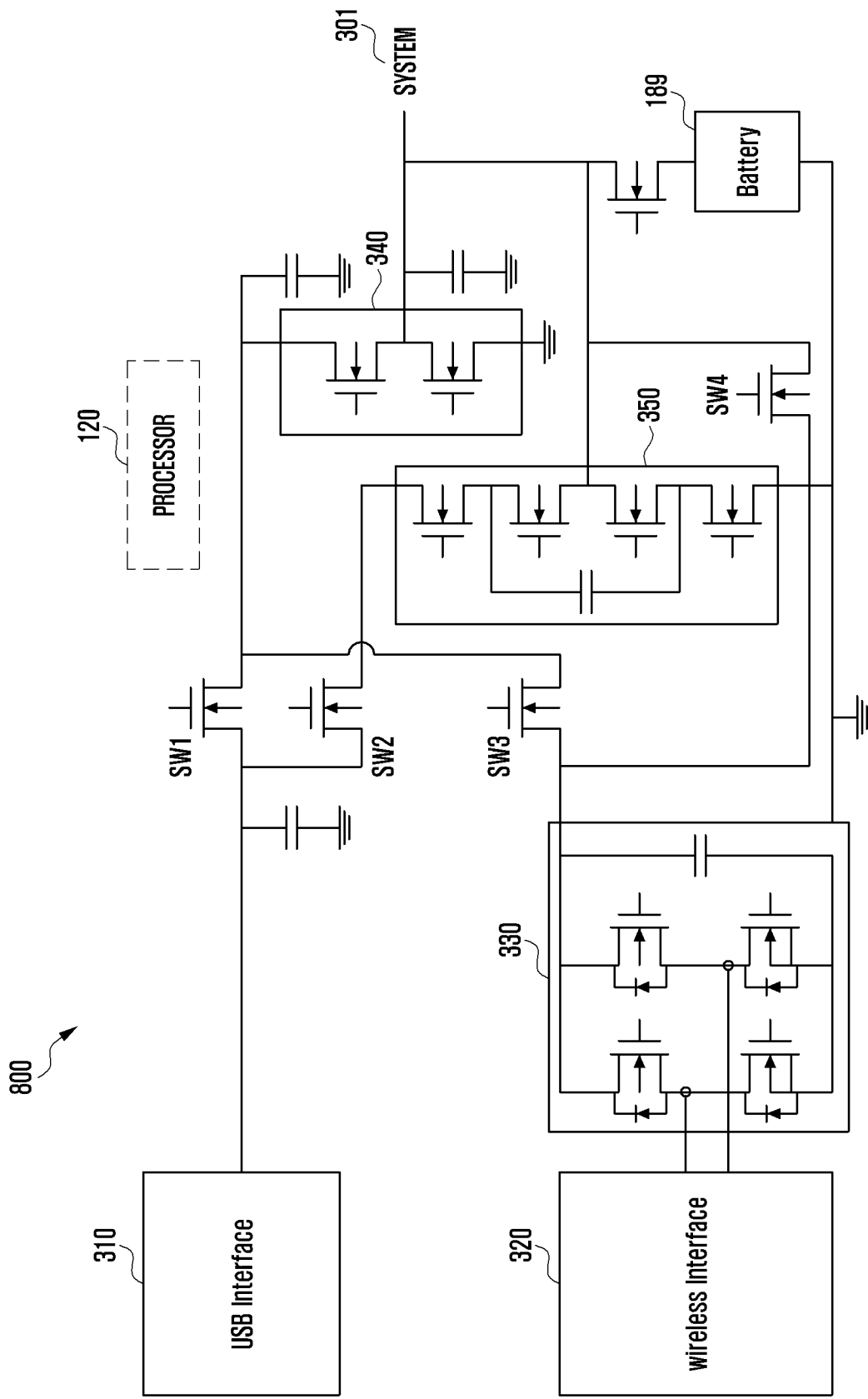
FIG. 8 is a block diagram illustrating an electronic device including a wireless charging circuit that is capable of establishing a path that directly connects a battery and a wireless charging IC according to an embodiment.

FIG. 8 is a block diagram illustrating an electronic device 800 including a wireless charging circuit that is capable of establishing a path that directly connects the first battery 189 and the wireless charging IC 330 according to an embodiment.

The electronic device 800 of FIG. 8 may include an embodiment that is at least partially similar to, or is different from, the electronic device 101 of FIG. 1 or the electronic device 300 of FIG. 3.

Hereinafter, in connection with FIG. 8, only the features of the electronic device 800 will be described that have not been described in or that have been changed from the descriptions of FIG. 1 or FIGS. 3 to 7.

Referring to FIG. 8, the electronic device 800 according to an embodiment may establish a path that directly connects the first battery 189 and the wireless charging IC 330, unlike the electronic device 300 illustrated in FIG. 3. According to an embodiment, the electronic device 800 may further include a fourth switch (SW4) to establish a path that directly connects the first battery 189 and the wireless charging IC 330. The fourth switch (SW4) may be embodied as a metal-oxide semiconductor field effect transistor (MOSFET).

According to an embodiment, the fourth switch (SW4) may switch on or off the electrical connection between the first charger 189 and the wireless charging IC 330. According to an embodiment, when a wireless power sharing function is performed, the processor 120 may control the fourth switch (SW4) in consideration of the type of an external device that is aligned with a coil (not illustrated) of the wireless interface 320, and a charging state (e.g., a constant current (CC) mode or a constant voltage (CV) mode) in which the external device charges an external battery (not illustrated) (e.g., a second battery) of the external device. According to an embodiment, in the case in which the external device is a relatively low-voltage device such as a smart watch or wireless earphones (e.g., true wireless stereo), the processor 120 may turn on the fourth switch (SW4) so as to electrically connect the first battery 189 and the wireless charging IC 330. According to an embodiment, in the case in which the external device is a relatively high-voltage device such as a smartphone, and the external device is in the state of charging an external battery (not illustrated) of the external device in a CV mode, the processor 120 may turn on the fourth switch (SW4) so as to electrically connect the first battery 189 and the wireless charging IC 330.

In various embodiments of the disclosure, a relatively high-voltage device may be a device that charges its battery (e.g., a second battery) using a relatively high voltage level (e.g., approximately 7V). The relatively high-voltage device may be a device configured to receive a first power. For example, a smartphone may charge its battery (e.g., the second battery) with high efficiency when a wireless power of approximately 7V is input. In various embodiments of the disclosure, a relatively low-voltage device may be a device that charges a battery (e.g., the second battery) using a relatively low voltage level (e.g., approximately 5V). The relatively low-voltage device may be configured to receive a second power lower than the first power. For example, the smart watch or wireless earphones (e.g., true wireless stereo) may charge its battery (e.g., the second battery) with high efficiency when a wireless power of approximately 5V is input. According to various embodiments of the disclosure, the relatively low-voltage device may be referred to as a device that requests, from a device that supplies a wireless power, a reference voltage level (e.g., approximately 5V) in order to charge its battery (e.g., the second battery). According to various embodiments of the disclosure, the relatively high-voltage device may be referred to as a device that requests, from a device that supplies a wireless power, a voltage higher than the reference voltage level (e.g., approximately 5V) in order to charge its battery (e.g., the second battery).

According to an embodiment, in the case in which the fourth switch (SW4) is turned on, the voltage of the first battery 189 may be directly provided as a driving voltage of the wireless charging IC 330, without passing through a load such as a charger (e.g., the first charter 340 or the second charger 350).

According to an embodiment, the electronic device 101 may receive a first voltage from a wired charging unit, and may charge the first battery 189 by supplying the first voltage to the first charger 340 or the second charger 350.

According to an embodiment, while charging the first battery 189, the electronic device 101 may perform a wireless power sharing function that supplies wireless power to the external device including the second battery via the wireless interface 320.

According to an embodiment, based on the performing of the wireless power sharing function, the electronic device 101 may identify the type of the electronic device aligned with the coil, may determine a second voltage based on whether the type of the external device is a first device (e.g., a relatively high-voltage device) or a second device (e.g., a relatively low-voltage device), and may control the wireless charging IC 330 to generate a current of the coil based on the second voltage. The second voltage may be a voltage lower than the first voltage.

Figure 9:
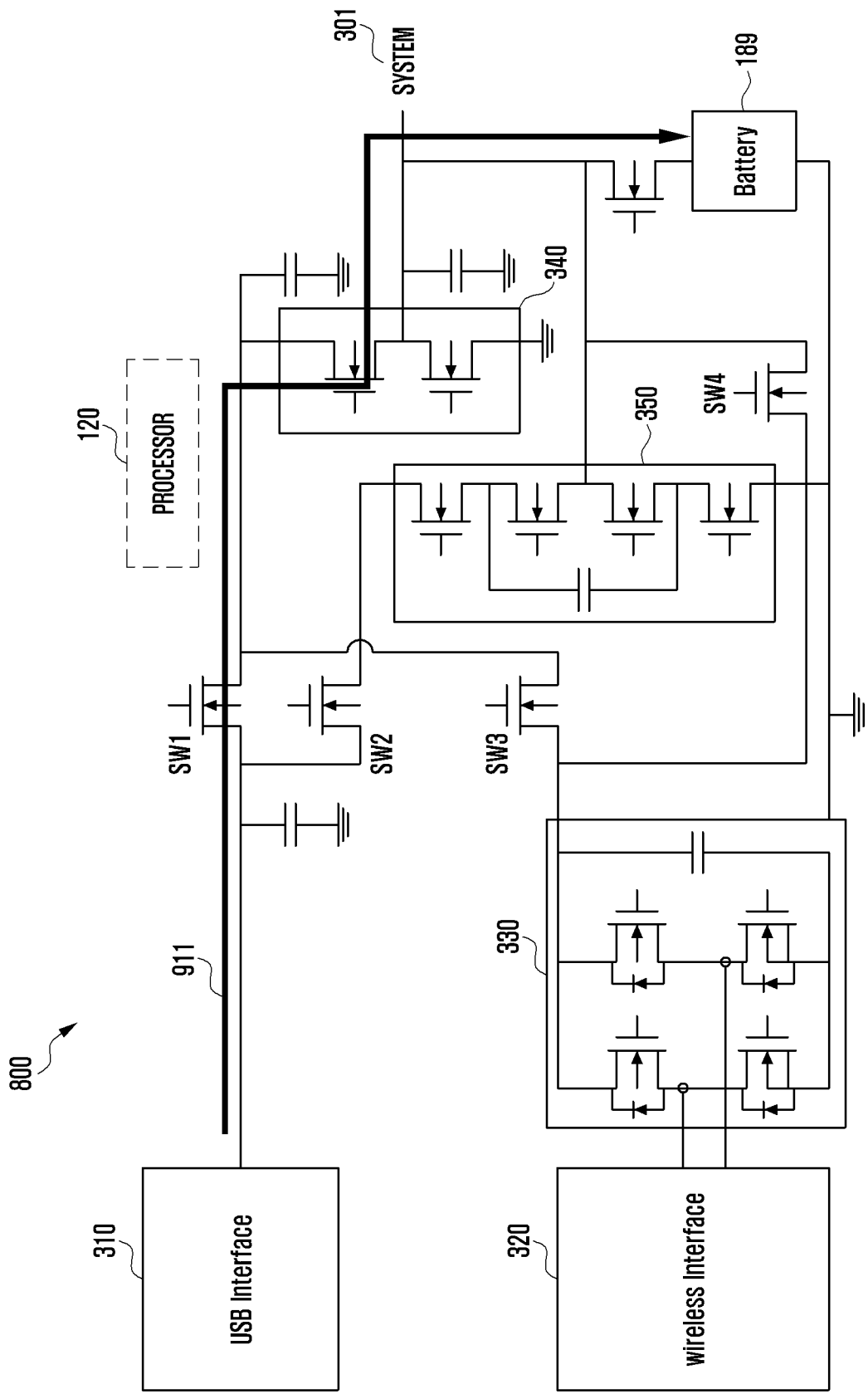
FIG. 9 is a diagram illustrating the state in which a wired charging unit is connected to an electronic device according to the embodiment of FIG. 8.

FIG. 9 is a diagram illustrating the state in which a wired charging unit is connected to the electronic device 800 according to the embodiment of FIG. 8.

Figure 10:
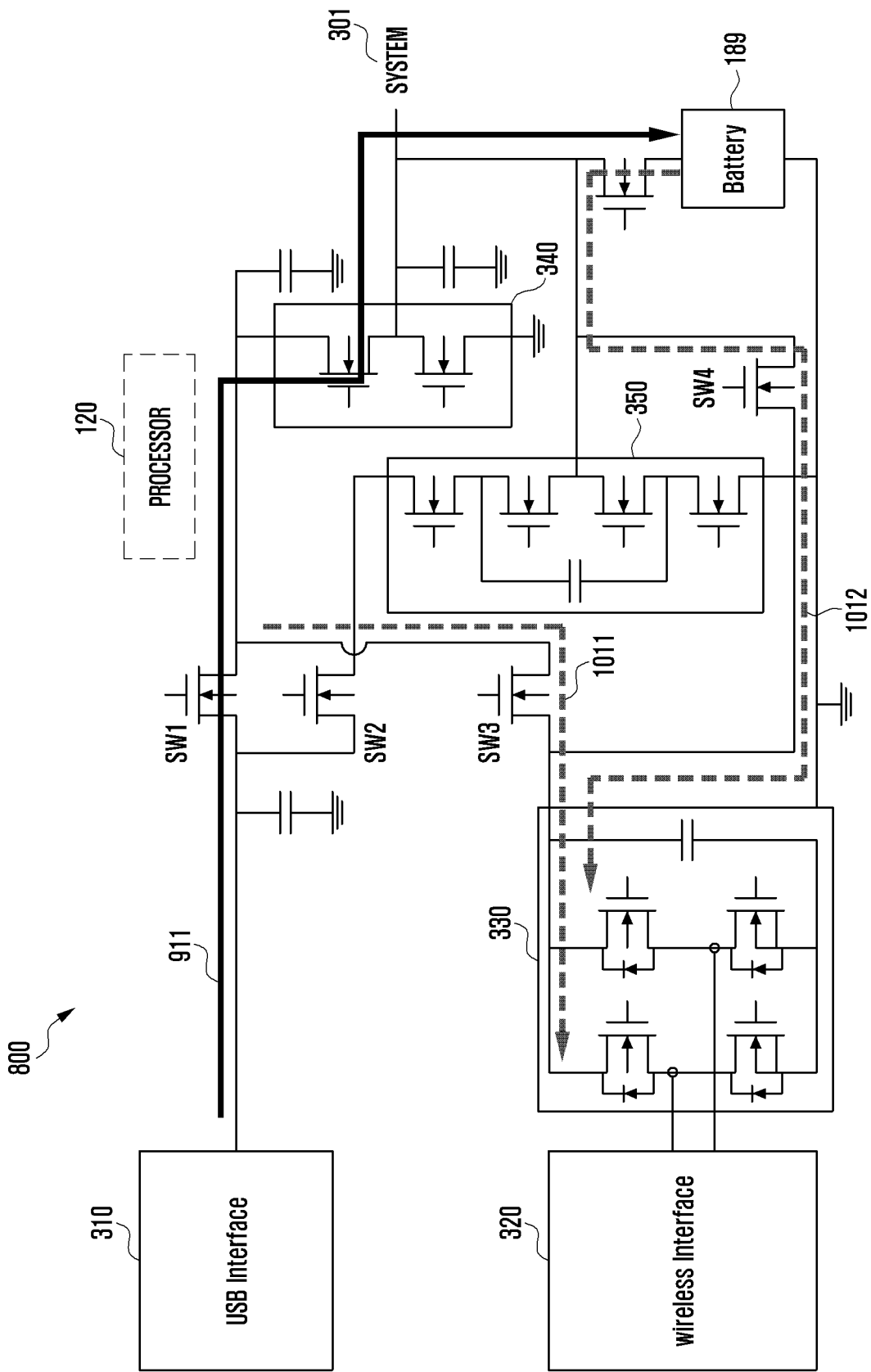
FIG. 10 is a diagram illustrating the state in which a wired charging unit is connected to an electronic device and, simultaneously, a wireless power sharing function is performed according to the embodiment of FIG. 8.

FIG. 10 is a diagram illustrating the state in which a wired charging unit is connected to the electronic device 800 and, simultaneously, a wireless power sharing function is performed according to the embodiment of FIG. 8.

Referring to FIG. 9, the processor 120 according to an embodiment may identify the type of wired charging unit when a wired charging unit is connected to the electronic device 800. According to an embodiment, in the case in which the connected wired charging unit is not a PPS charging unit, the processor 120 may turn on a first switch (SW1) so as to electrically connect the USB interface 310 and the first charger 340, as shown by an arrow 911 of FIG. 9. For example, in the case in which a charging unit different from the PPS charging unit, for example, a quick charging unit (e.g., a first charging unit or a second charging unit) or a normal charging unit (e.g., a third charging unit), is connected to the electronic device 800, the processor 120 may turn on the first switch (SW1) so as to electrically connect the USB interface 310 and the first charger 340, as shown by the arrow 911 of FIG. 9. According to an embodiment, the processor 120 may activate the first charger 340 via the electrical connection between the USB interface 310 and the first charger 340, and may charge the first battery 189 using the first charger 340.

Referring to FIG. 10, the processor 120 according to an embodiment may perform a wireless power sharing function while charging the first battery 189 using the first charger 340. For example, the processor 120 may provide a user interface, which is not illustrated, via a display (e.g., the display module 160 of FIG. 1), and may perform a wireless power sharing function based on a user input via the user interface. According to an embodiment, the processor 120 may perform a wireless power sharing function based on a user input provided via a physical button (not illustrated) disposed in a part of the housing (not illustrated) of the electronic device 800. According to an embodiment, based on various user inputs or various events (e.g., events based on wireless communication, a designated gesture input from a user or an artificial intelligence application) in addition to the above-mentioned embodiments, the processor 120 may perform a wireless power sharing function.

According to an embodiment, when a wireless power sharing function is performed, the processor 120 may control a third switch (SW3) and a fourth switch (SW4) in consideration of the type of an external device that is aligned with a coil (not illustrated) of the wireless interface 320, and a charging state (e.g., a constant current (CC) mode or a constant voltage (CV) mode) in which an external device charges an external battery (not illustrated) (e.g., a second battery) of the external device.

According to an embodiment, the processor 120 may receive power from a charging unit via the USB interface 310, and may perform control so as to supply the power to the wireless charging IC 330. The processor 120 may perform control so as to provide a designated voltage to the wireless charging IC 330. For example, the processor 120 may request and/or control the charging unit to change power (a voltage and/or current).

The wireless charging IC 330 may generate a current of a coil based on a designated voltage obtained from the first charger 340, and may supply wireless power to an external device.

According to an embodiment, in the case in which the external device is a relatively high-voltage device such as a smartphone, and the external device is in the state of charging an external battery (not illustrated) of the external device in a CV mode, the processor 120 may turn off the third switch (SW3) and may turn on the fourth switch (SW4), so as to directly connect the first battery 189 and the wireless charging IC 330, as shown by an arrow 1012 of FIG. 10. According to an embodiment, in the case in which the fourth switch (SW4) is turned on, the voltage of the first battery 189 may be directly provided as a driving voltage of the wireless charging IC 330, without passing through a load such as a charger (e.g., the first charter 340 or the second charger 350). The electronic device 800 according to an embodiment may substantially increase the efficiency of wireless charging, and may substantially decrease heat generated from the electronic device and/or the external device, when performing wireless charging. According to an embodiment, the processor 120 may charge the first battery 189 using the first charger 340, and may turn on the fourth switch (SW4) so as to supply power to the wireless charging IC 330. The electronic device 800 according to an embodiment may charge the first battery 189 with a relatively high-power using the first charger 340 so as to substantially increase a charging speed, and may supply a relatively low power and a relatively low voltage to the external device when performing wireless charging so as to substantially decrease heat generated from the electronic device and/or the external device.

According to an embodiment, in the case in which the external device is a relatively low-voltage device such as a smart watch or wireless earphones (e.g., true wireless stereo), the processor 120 may turn off the third switch (SW3) and may turn on the fourth switch (SW4), so as to directly connect the first battery 189 and the wireless charging IC 330 as shown by the arrow 1012 of FIG. 10. According to an embodiment, in the case in which the fourth switch (SW4) is turned on, the voltage of the first battery 189 may be directly provided as a driving voltage of the wireless charging IC 330, without passing through a load such as a charger (e.g., the first charter 340 or the second charger 350). The electronic device 800 according to an embodiment may substantially increase the efficiency of wireless charging, and may substantially decrease heat generated from the electronic device and/or the external device, when performing wireless charging. According to an embodiment, when a wireless power sharing function is performed, the processor 120 may perform control so as to supply a first power to the wireless charging IC 330, and may determine whether a designated condition is satisfied. Based on the fact that the designated condition is satisfied while the first power is supplied to the wireless charging IC 330, the processor 120 may turn off the third switch (SW3) and may turn on the fourth switch SW4, so as to directly connect the first battery 189 and the wireless charging IC 330, as shown by the arrow 1012 of FIG. 10. According to an embodiment, the designated condition may include the state in which the external device charges its battery (e.g., the second battery) in the CV mode, or the state in which the external device is in the state of being a relatively low-voltage device that requests the reference voltage level for charging its battery (e.g., the second battery).

According to an embodiment, in the state in which the first battery 189 is not charged (e.g., the state in which a charging unit is not connected), a wireless power sharing function may be capable of being performed. In the case in which the external device is a relatively high-voltage device such as a smartphone, the processor 120 may turn on the third switch (SW3) and turn off the fourth switch (SW4) as shown by an arrow 1011 of FIG. 10. The processor 120 may perform control so as to provide a designated voltage to the wireless charging IC 330 by performing control so that the first charger 340 operates in a boost mode. The wireless charging IC 330 may generate a current of a coil based on a designated voltage obtained from the first charger 340, and may supply wireless power to the external device. According to an embodiment, in the case in which the external device is in the state of charging its battery (e.g., the second battery) in the constant current (CC) mode, the processor 120 may turn on the third switch (SW3) and turn off the fourth switch (SW4) as shown by the arrow 1011 of FIG. 10. The processor 120 may perform control so as to provide a designated voltage to the wireless charging IC 330 by performing control so that the first charger 340 operates in a reverse boost mode. According to an embodiment, in the case in which the charging state of the external device is in a constant voltage (CA) charging state, the processor 120 may turn off the third switch (SW3) and may turn on the fourth switch (SW4).

Figure 11:
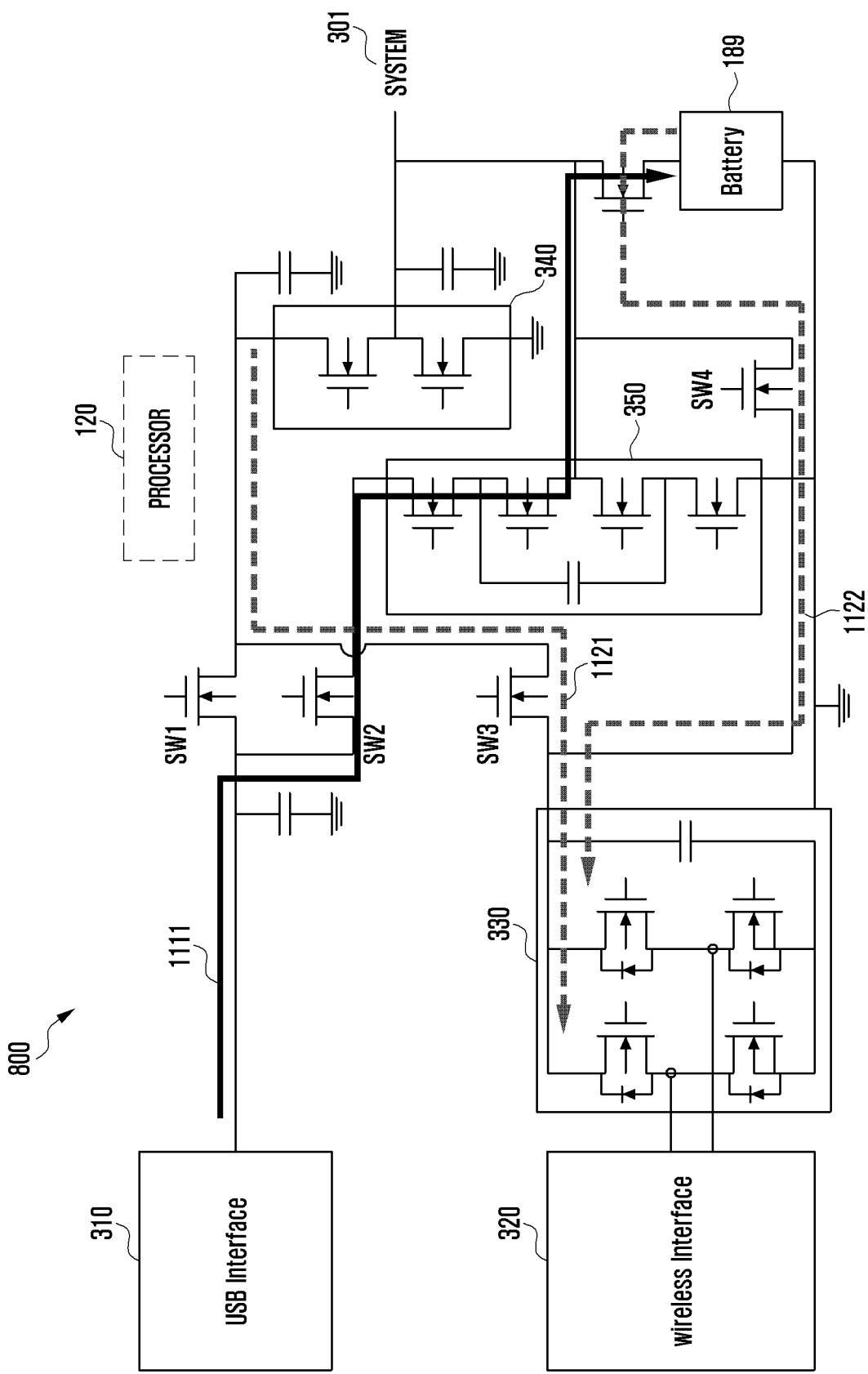
FIG. 11 is a diagram illustrating the state in which a wired charging unit that supports a PPS function is connected to an electronic device and, simultaneously, a wireless power sharing function is performed according to the embodiment of FIG. 8.

FIG. 11 is a diagram illustrating the state in which a wired charging unit that supports a PPS function is connected to the electronic device 800 and, simultaneously, a wireless power sharing function is performed according to the embodiment of FIG. 8.

Referring to FIG. 11, the processor 120 according to an embodiment may identify the type of wired charging unit when a wired charging unit is connected to the electronic device 800. According to an embodiment, in the case in which a connected wired charging unit is a PPS charging unit, the processor 120 may turn on a second switch (SW2) so as to electrically connect the USB interface 310 and the second charger 350, as shown by an arrow 1111 of FIG. 11. According to an embodiment, the processor 120 may activate the second charger 350 via the electrical connection between the USB interface 310 and the second charger 350, and may charge the first battery 189 using the second charger 350.

According to an embodiment, the second charger 350 may charge the first battery 189 by performing power conversion that decreases an input voltage input from a wired charging unit at a designated magnification and increases an input current input from the wired charging unit at a designated magnification.

According to an embodiment, the processor 120 may perform a wireless power sharing function while charging the first battery 189 using the second charger 350.

According to an embodiment, when the wireless power sharing function is performed, the processor 120 may control a third switch (SW3) and a fourth switch (SW4) in consideration of the type of an external device that is aligned with a coil (not illustrated) of the wireless interface 320, and a charging state (e.g., a constant current (CC) mode or a constant voltage (CV) mode) in which an external device charges an external battery (not illustrated) (e.g., a second battery) of the external device.

According to an embodiment, in the case in which the external device is a relatively high-voltage device such as a smartphone, the processor 120 may turn on the third switch (SW3) and turn off the fourth switch (SW4) as shown by an arrow 1121 of FIG. 11. The processor 120 may perform control so as to provide a designated voltage to the wireless charging IC 330. The wireless charging IC 330 may generate a current of a coil based on a designated voltage obtained from the first charger 340, and may supply wireless power to the external device.

According to an embodiment, in the case in which the external device is a relatively high-voltage device such as a smartphone, and the external device is in the state of charging an external battery (not illustrated) of the external device in a CV mode, the processor 120 may turn off the third switch (SW3) and may turn on the fourth switch (SW4), so as to directly connect the first battery 189 and the wireless charging IC 330, as shown by an arrow 1122 of FIG. 11. According to an embodiment, in the case in which the fourth switch (SW4) is turned on, the voltage of the first battery 189 may be directly provided as a driving voltage of the wireless charging IC 330, without passing through a load such as a charger (e.g., the first charter 340 or the second charger 350). The electronic device 800 according to an embodiment may substantially increase the efficiency of wireless charging and/or may substantially decrease heat generated from the electronic device and/or the external device, when performing wireless charging.

According to an embodiment, in the case in which the external device is a relatively low-voltage device such as a smart watch or wireless earphones (e.g., true wireless stereo), the processor 120 may turn off the third switch (SW3) and may turn on the fourth switch (SW4), so as to directly connect the first battery 189 and the wireless charging IC 330 as shown by the arrow 1122 of FIG. 11. According to an embodiment, in the case in which the fourth switch (SW4) is turned on, the voltage of the first battery 189 may be directly provided as a driving voltage of the wireless charging IC 330, without passing through a load such as a charger (e.g., the first charter 340 or the second charger 350). The electronic device 800 according to an embodiment may substantially increase the efficiency of wireless charging and may substantially decrease heat generated, when performing wireless charging.

According to an embodiment, the processor 120 may perform a wireless power sharing function while charging the first battery 189 with a relatively high-power using the second charger 350. Based on the charging state of the external device and/or the type of the electronic device, the processor 120 may perform control so as to supply a driving voltage to the wireless charging IC 330 using the first charger 340 as shown by the arrow 1121 of FIG. 11, or may perform control so as to supply a driving voltage to the wireless charging IC 330 using the fourth switch (SW4) as shown by the arrow 1122 of FIG. 11. The electronic device 800 may receive an external power having a relatively high voltage (e.g., 9V) using the USB interface 310, may provide the same to a battery and/or system, and may provide a relatively low-voltage (e.g., 5V) to the wireless charging IC 330.

Figure 12:
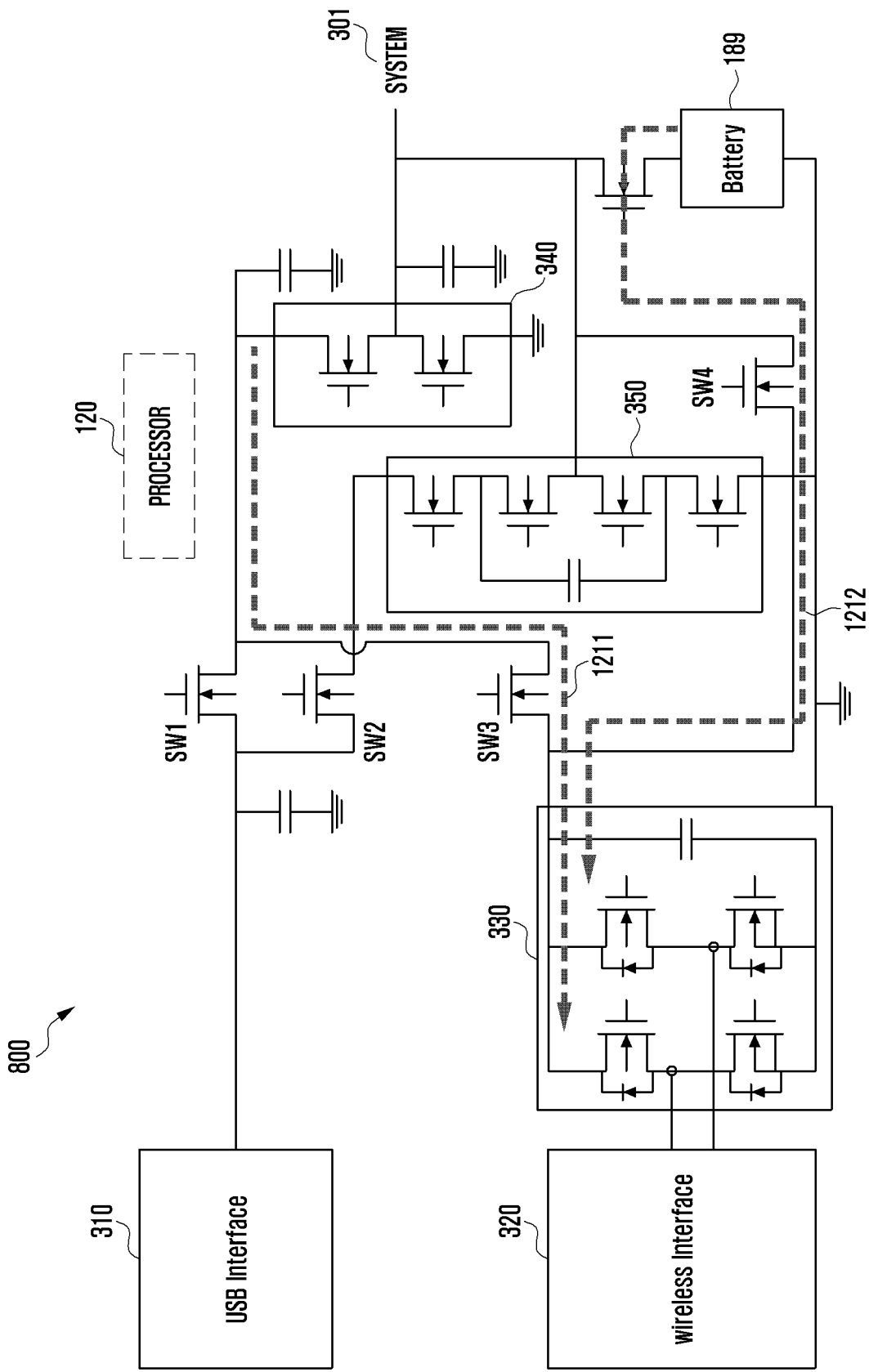
FIG. 12 is a diagram illustrating the state in which a wired charging unit is not connected to an electronic device and a wireless power sharing function is performed according to the embodiment of FIG. 8.

FIG. 12 is a diagram illustrating the state in which a wired charging unit is not connected to the electronic device 800 and a wireless power sharing function is performed according to the embodiment of FIG. 8.

Referring to FIG. 12, the processor 120 according to an embodiment may perform a wireless power sharing function in the state in which a wired charging unit is not connected.

According to an embodiment, when the wireless power sharing function is performed, the processor 120 may control a third switch (SW3) and a fourth switch (SW4) in consideration of the type of an external device that is aligned with a coil (not illustrated) of the wireless interface 320, and a charging state (e.g., a constant current (CC) mode or a constant voltage (CV) mode) in which an external device charges an external battery (not illustrated) (e.g., a second battery) of the external device.

According to an embodiment, in the case in which the external device is a relatively high-voltage device such as a smartphone, the processor 120 may turn on the third switch (SW3) and may turn off the fourth switch (SW4) as shown by an arrow 1211 of FIG. 12. The processor 120 may perform control so as to provide a designated voltage to the wireless charging IC 330 by performing control so that the first charger 340 operates in a reverse boost mode. The wireless charging IC 330 may generate a current of a coil based on a designated voltage obtained from the first charger 340, and may supply wireless power to the external device.

According to an embodiment, in the case in which the external device is a relatively high-voltage device such as a smartphone, and the external device is in the state of charging an external battery (not illustrated) of the external device in a CV mode, the processor 120 may turn off the third switch (SW3) and may turn on the fourth switch (SW4), so as to directly connect the first battery 189 and the wireless charging IC 330, as shown by an arrow 1212 of FIG. 12. According to an embodiment, in the case in which the fourth switch (SW4) is turned on, the voltage of the first battery 189 may be directly provided as a driving voltage of the wireless charging IC 330, without passing through a load such as a charger (e.g., the first charter 340 or the second charger 350). The electronic device 800 according to an embodiment may substantially increase the efficiency of wireless charging and may substantially decrease heat generated from the electronic device and/or the external device, when performing wireless charging.

According to an embodiment, in the case in which the external device is a relatively low-voltage device such as a smart watch or wireless earphones (e.g., true wireless stereo), the processor 120 may turn off the third switch (SW3) and may turn on the fourth switch (SW4), so as to directly connect the first battery 189 and the wireless charging IC 330 as shown by the arrow 1212 of FIG. 12. According to an embodiment, in the case in which the fourth switch (SW4) is turned on, the voltage of the first battery 189 may be directly provided as a driving voltage of the wireless charging IC 330, without passing through a load such as a charger (e.g., the first charter 340 or the second charger 350). The electronic device 800 according to an embodiment may substantially increase the efficiency of wireless charging and may substantially decrease heat generated from the electronic device and/or the external device, when performing wireless charging.

Figure 13:
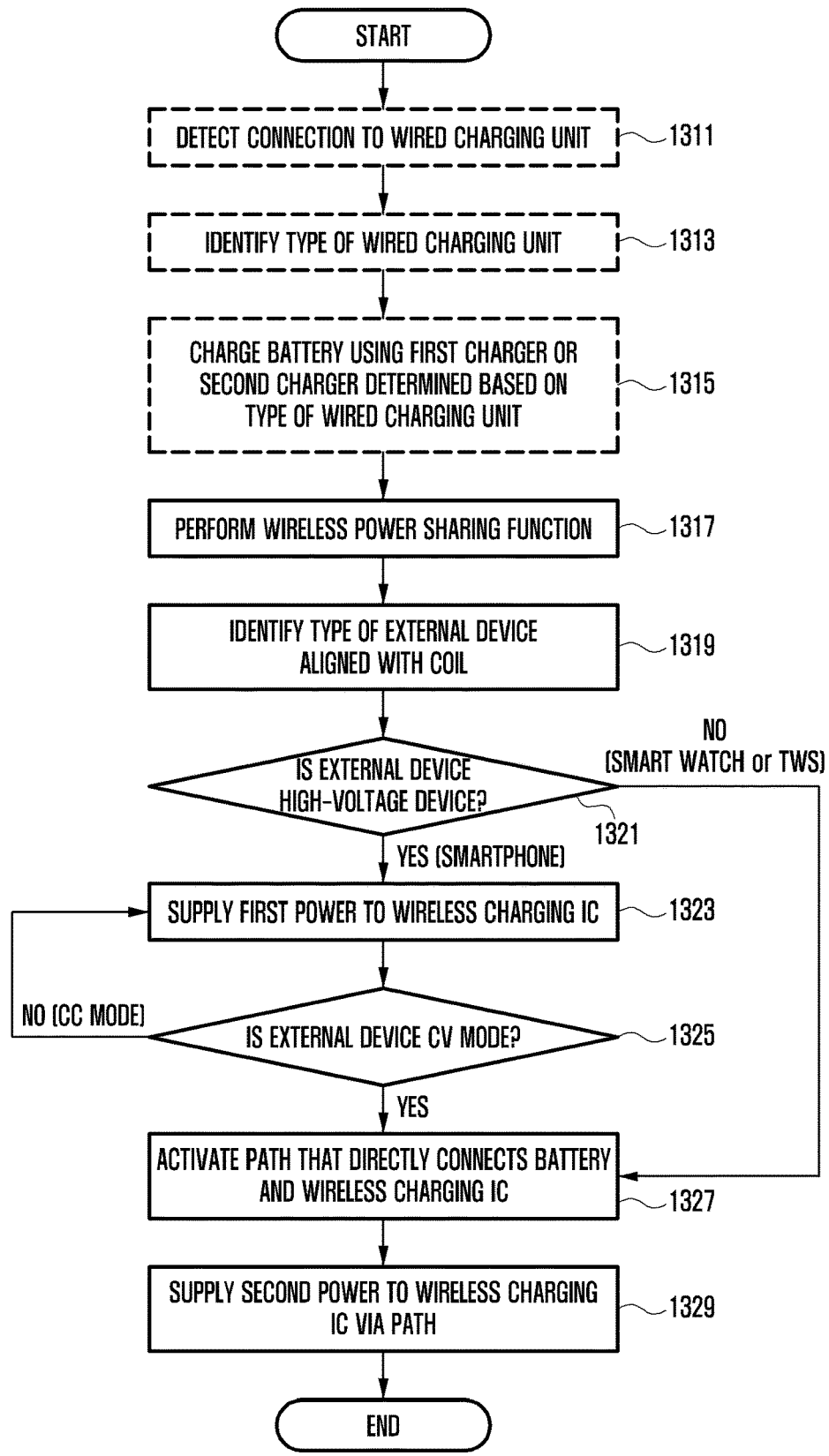
FIG. 13 is a flowchart illustrating the operation of an electronic device according to an embodiment.

FIG. 13 is a flowchart illustrating the operation of the electronic device 800 according to an embodiment.

According to one or more embodiments, at least a part of the operations illustrated in FIG. 13 may be omitted. Before or after at least some operations illustrated in FIG. 13, at least some operations mentioned in the disclosure with reference to other drawings may be further included. For example, the electronic device 800 according to an embodiment may omit operations 1311, 1313, and 1315, and may start from operation 1317.

The operations illustrated in FIG. 13 may be performed by the processor 120 (e.g., the processor 120 of FIG. 1). For example, a memory (e.g., the memory 130 of FIG. 1) of the electronic device 800 may store instructions that cause the processor 120 to perform at least some operations illustrated in FIG. 13, when the instructions are performed.

In operation 1311, the electronic device 800 according to an embodiment may detect that a wired charging unit is connected. For example, the processor 120 may detect that the wired charging unit is connected via the USB interface 310. According to an embodiment, based on the control performed by the electronic device 800, the wired charging unit may be a PPS charging unit capable of adjusting an output voltage in the range of approximately 3V to approximately 21V, a charging unit (e.g., hereinafter "a first charging unit") that provides a fixed output voltage of approximately 9V and/or approximately 5V, a charging unit (hereinafter, "a second charging unit") that provides an output voltage in the range of approximately 3.5V to approximately 22V, or a charging unit (hereinafter, "a third charging unit") that provides a fixed output voltage of approximately 5V. The first charging unit, the second charging unit, or the third charging unit may be referred to as a charging unit that does not support a PPS function or a "non PPS charging unit".

In operation 1313, the electronic device 800 according to an embodiment may identify the type of wired charging unit. For example, the USB interface 310 may be connected to the wired charging unit via a CC terminal of an USB type-C, and may identify the type of wired charging unit via a type C detection function that identifies a resistance of pull-up (Rp) value via the CC terminal.

In operation 1315, the electronic device 800 according to an embodiment may charge the first battery 189 using the first charger 340 or the second charger 350 determined based on the type of wired charging unit. According to an embodiment, in the case in which the wired charging unit is a PPS charging unit, the processor 120 may turn on a second switch (SW2) so as to electrically connect the USB interface 310 and the second charger 350. The processor 120 may activate the second charger 350 via the electrical connection between the USB interface 310 and the second charger 350, and may charge the first battery 189 using the second charger 350.

According to an embodiment, in the case in which the connected wired charging unit is a charging unit (e.g., the first charging unit, the second charging unit, or the third charging unit) that does not support a PPS function, the processor 120 may turn on a first switch (SW1) so as to electrically connect the USB interface 310 and the first charger 340. The processor 120 may activate the first charger 340 via the electrical connection between the USB interface 310 and the first charger 340, and may charge the first battery 189 using the first charger 340.

In operation 1317, the electronic device 800 according to an embodiment may perform a wireless power sharing function. The processor 120 according to an embodiment may perform the wireless power sharing function while charging the first battery 189 using the first charger 340. The processor 120 according to an embodiment may perform the wireless power sharing function while charging the first battery 189 using the second charger 350. The processor 120 according to an embodiment may perform a wireless power sharing function while the wired charging unit and the electronic device 800 are not connected.

In operation 1319, in the case in which the wireless power sharing function is performed, the electronic device 800 according to an embodiment may identify the type of an external device aligned with a coil (not illustrated) of the wireless interface 320. According to an embodiment, the electronic device 800 may identify the type of external device upon reception of a designated packet based on the wireless charging standard (e.g., wireless power consortium (WPC) standard) via a coil (not illustrated) of the wireless interface 320. According to an embodiment, the external device may be a relatively high-voltage device such as a smartphone, or may be a relatively low-voltage device such as a smart watch or wireless earphones (e.g., true wireless stereo).

In various embodiments of the disclosure, the relatively high-voltage device may be a device that charges its battery (e.g., a second battery) using a relatively high voltage level (e.g., approximately 7V). For example, a smartphone may charge its battery (e.g., the second battery) with high efficiency when a wireless power of approximately 7V is input. Various embodiments of the disclosure, the relatively low-voltage device may be a device that charges its battery (e.g., the second battery) using a relatively low voltage level (e.g., approximately 5V). For example, the smart watch or wireless earphones (e.g., true wireless stereo) may charge its battery (e.g., the second battery) with high efficiency when a wireless power of approximately 5V is input. According to various embodiments of the disclosure, the relatively low-voltage device may be referred to as a device that requests, from a device that supplies a wireless power, a reference voltage level (e.g., approximately 5V) in order to charge its battery (e.g., the second battery). According to various embodiments of the disclosure, the relatively high-voltage device may be referred to as a device that requests, from a device that supplies a wireless power, a voltage higher than a reference voltage level (e.g., approximately 5V) in order to charge its battery (e.g., the second battery).

In operation 1321, the electronic device 800 according to an embodiment may determine whether the external device aligned with the coil of the wireless interface 320 is a relatively high-voltage device.

According to an embodiment, in the case in which the external device aligned with the coil is a relatively high-voltage device ("Yes" in operation 1321), the electronic device 800 may proceed with operation 1323.

According to an embodiment, in the case in which the external device aligned with the coil is a relatively low-voltage device ("No" in operation 1321), the electronic device 800 may proceed with operation 1327.

In operation 1323, the electronic device 800 according to an embodiment may supply a first power to the wireless charging IC 330. According to an embodiment, in the case in which the external device is a relatively high-voltage device such as a smartphone, the processor 120 may turn on a third switch (SW3) and may turn off a fourth switch (SW4) as shown by the arrow 1011 of FIG. 10. The processor 120 may perform control so that a first power having a designated first voltage (e.g., approximately 9V) is provided to the wireless charging IC 330. The wireless charging IC 330 may generate a current of a coil based on the designated first voltage obtained from the first charger 340, and may supply wireless power to the external device.

In operation 1325, the electronic device 800 according to an embodiment may identify whether the external device is in the state of charging an external battery (e.g., the second battery) (not illustrated) of the external device in a CV mode while the first power is supplied to the wireless charging IC 330. For example, the processor 120 may determine that the external device is changed from a constant current (CC) mode to a constant voltage (CV) mode upon on reception of a designated packet based on the wireless charging standard (e.g., wireless power consortium (WPC) standard) via a coil (not illustrated) of the wireless interface 320.

According to an embodiment, in the case in which the external device is not in the charging state (e.g., "No" in operation 1325) that charges the external battery (not illustrated) of the external device in the CV mode, the electronic device 800 may return to operation 1323 again.

According to an embodiment, in the case in which the external device is in the charging state (e.g., "Yes" in operation 1325) that charges the external battery (not illustrated) of the external device in the CV mode, the electronic device 800 may proceed with operation 1327.

In operation 1327, the electronic device 800 according to an embodiment may activate a path that directly connects the first battery 189 and the wireless charging IC 330. According to an embodiment, the processor 120 may turn off the third switch (SW3) and may turn on the fourth switch (SW4), so as to directly connect the first battery 189 and the wireless charging IC 330 as shown by the arrow 1012 of FIG. 10. According to an embodiment, in the case in which the fourth switch (SW4) is turned on, the voltage of the first battery 189 may be directly provided as a driving voltage of the wireless charging IC 330, without passing through a load such as a charger (e.g., the first charter 340 or the second charger 350).

According to an embodiment, the wireless charging IC 330 may be directly connected to the first battery 189 via the fourth switch (SW4) and may provide a second power having a second voltage (e.g., approximately 5V). The wireless charging IC 330 may generate a current of a coil based on a designated second voltage directly provided via the fourth switch (SW4), and may supply wireless power to the external device.

The electronic device 101 according to various embodiments may include the first battery 189, the wireless interface 320 including a coil, the wireless charging IC 330 electrically connected to the coil, the USB interface 310 configured to be connected to a wired charging unit, the first charger 340, the second charger 350 including a power converter configured to output an input current supplied from the wired charging unit by increasing at a designated magnification and to output an input voltage supplied from the wired charging unit by decreasing at the designated magnification, and the processor 120, and the processor 120 may be configured to cause a wireless power sharing function to be performed that supplies wireless power to an external device including a second battery via the wireless interface 320, to identify, based on the performing of the wireless power sharing function, the type of the external device aligned with the coil, to cause a first power to be supplied to the wireless charging IC 330 responsive to determining that the external device is a first device, the first device being a device that requests a voltage higher than a reference voltage level in order to charge the second battery, to control the wireless charging IC 330 to generate a current of the coil based on the first power, to activate a path that directly connects the first battery 189 and the wireless charging IC 330 responsive to determining that the external device is in the state of charging the second battery in a constant voltage (CV) mode while the first power is provided to the wireless charging IC 330, and to supply a second power lower than the first power to the wireless charging IC 330 via the path.

According to an embodiment, the electronic device may further include a first switch configured to switch on or off the electrical connection between the USB interface 310 and the first charger 340, a second switch configured to switch on or off the electrical connection between the USB interface 310 and the second charger 350, a third switch configured to switch on or off the electrical connection between the first charger 340 and the wireless charging IC 330, and a fourth switch configured to switch on or off the electrical connection between the first battery 189 and the wireless charging IC 330.

According to an embodiment, the processor 120 may be configured to activate the path by turning off the third switch and turning on the fourth switch.

According to an embodiment, the processor 120 may be configured to deactivate the path by turning on the third switch and turning off the fourth switch.

According to an embodiment, the processor 120 may be configured to activate the path that directly connects the first battery 189 and the wireless charging IC 330 responsive to the wireless power sharing function being performed and the external device being a second device, wherein the second device may be a device that requests the reference voltage level in order to charge the second battery.

According to an embodiment, the processor 120 may be configured to detect that the wired charging unit is connected via the USB interface 310, to identify the type of wired charging unit based on determining that the wired charging unit is connected, to charge, based on the type of wired charging unit, the first battery 189 using the first charger 340 or the second charger 350, to perform control so as to supply the first power to the wireless charging IC 330 responsive to the wireless power sharing function being performed while the first battery 189 is charged, and to determine whether a condition is satisfied, to activate the path that directly connects the first battery 189 and the wireless charging IC 330 based on determining that the condition is satisfied while the designated first power is supplied to the wireless charging IC 330.

According to an embodiment, the designated condition is selected from a group consisting of the state in which the external device charges the second battery in the CV mode and the state in which the external device is a second device that requests the reference voltage level in order to charge the second battery.

A method of the electronic device 101 including the first battery 189 according to various embodiments may include an operation of performing a wireless power sharing function that supplies wireless power to an external device including a second battery via a wireless interface, an operation of identifying, responsive to the performing the wireless power sharing function, the type of the external device aligned with a coil of the wireless interface 320, an operation of supplying a first power to a wireless charging IC 330 connected to the wireless interface 320 responsive to the external device being a first device, the first device being a device that requests a voltage higher than a reference voltage level in order to charge the second battery, an operation of controlling the wireless charging IC 330 to generate a current of the coil based on the first power, an operation of activating a path that directly connects the first battery 189 and the wireless charging IC 330 responsive to determining that the external device is in the state of charging the second battery in a constant voltage (CV) mode while the first power is provided to the wireless charging IC 330, and an operation of supplying a second power lower than the first power to the wireless charging IC 330 via the path.

According to an embodiment, the electronic device 101 may include a first switch configured to switch on or off the electrical connection between the USB interface 310 and the first charger 340, a second switch configured to switch on or off the electrical connection between the USB interface 310 and the second charger 350, a third switch configured to switch on or off the electrical connection between the first charger 340 and the wireless charging IC 330, and a fourth switch configured to switch on or off the electrical connection between the first battery 189 and the wireless charging IC 330.

According to an embodiment, the operation of activating the path may include an operation of turning off the third switch and an operation of turning on the fourth switch.

According to an embodiment, the operation of deactivating the path may further include an operation of turning on the third switch and an operation of turning off the fourth switch.

According to an embodiment, the method may further include an operation of activating the path that directly connects the first battery 189 and the wireless charging IC 330 responsive to the wireless power sharing function being performed and the external device being a second device, and the second device may be a device that requests the reference voltage level in order to charge the second battery.

According to an embodiment, the method may further include an operation of detecting that a wired charging unit is connected via the USB interface 310, an operation of identifying the type of wired charging unit based on determining that the wired charging unit is connected, an operation of charging the first battery 189 using the first charger 340 or the second charger 350 based on the type of wired charging unit, an operation of performing control to supply a first power to the wireless charging IC 330 responsive to the wireless power sharing function being performed while the first battery is charged, and determining whether a condition is satisfied, an operation of activating the path that directly connects the first battery 189 and the wireless charging IC 330 based on the determining that the condition is satisfied while the first power is supplied to the wireless charging IC 330.

According to an embodiment, the designated condition may include the state in which the external device charges the second battery in the CV mode, or the state in which the external device is a second device that requests the reference voltage level in order to charge the second battery.

The electronic device 101 according to various embodiments may include the first battery 189, the wireless interface 320 including a coil, the wireless charging IC 330 electrically connected to the coil, the USB interface 310 configured to be connected to a wired charging unit, the first charger 340 including a switching regulator, the second charger 350 including a power converter configured to output an input current supplied from the wired charging unit by increasing at a designated magnification, and to output an input voltage supplied from the wired charging unit by decreasing at the designated magnification, and the processor 120, and the processor 120 may be configured to receive a first voltage from the wired charging unit via the USB interface 310, to cause the first battery 189 to be charged by supplying the first voltage to the first battery via the first charger 340 or the second charger 350, cause a wireless power sharing function to be performed that supplies wireless power to an external device including a second battery via the wireless interface 320 while charging the first battery 189, to identify the type of the external device aligned with the coil based on the performing of the wireless power sharing function, to determine a second voltage based on whether the type of the external device is a first device or a second device, and to control the wireless charging IC 330 to generate a current of the coil based on the second voltage, and the second voltage may be a voltage lower than the first voltage.

According to an embodiment, the processor 120 may be configured to determine whether a condition is satisfied while the wireless charging IC 330 generates, based on the second voltage, a current of the coil, and based on determining that the condition is satisfied, to activate a path that directly connects the first battery 189 and the wireless charging IC 330, wherein the condition is selected from a group that comprises the state in which the external device charges the second battery in a CV mode and the state in which the external device is the second device, the first device may be a device that requests a voltage higher than a reference voltage level for charging the second battery, and the second device may be in the state of being a second device that requests the reference voltage level for charging the second battery.

According to an embodiment, the device may further include a first switch configured to switch on or off the electrical connection between the USB interface 310 and the first charger 340, a second switch configured to switch on or off the electrical connection between the USB interface 310 and the second charger 350, a third switch configured to switch on or off the electrical connection between the first charger 340 and the wireless charging IC 330, and a fourth switch configured to switch on or off the electrical connection between the first battery 189 and the wireless charging IC 330.

According to an embodiment, the processor 120 may be configured to cause the first battery 189 to be charged by supplying the first voltage received from the wired charging unit to the second charger in the state in which the first battery 189 is charged in a constant current (CC) mode, and responsive to determining that the external device is the second device that requests a reference voltage level in order to charge the second battery, the processor may be configured to generate a current of the coil based on a second voltage generated from the first charger 340 or to generate a current of the coil based on a second voltage generated from the first battery 189.

According to an embodiment, the processor 120 may be configured to activate the path by turning off the third switch and turning on the fourth switch.

A method of the electronic device 101 including the first battery 189 according to various embodiments may include an operation of performing, by an electronic device 101, a wireless power sharing function, an operation of identifying a type of an external device aligned with a coil of a wireless interface 320 associated with a wireless interface integrated circuit (IC) 330 of the electronic device 101, an operation of determining whether the external device aligned with the coil is a relatively high-voltage device or a relatively low-voltage device, the relatively high-voltage device accepting a higher voltage than the relatively low-voltage device, an operation of responsive to determining that the external device aligned with the coil is a relatively high-voltage device, supplying first power from a first charging circuit 340 of the electronic device 101 to the wireless interface IC 330 while the external device is not in a constant voltage (CV) mode, and an operation of responsive to the relatively high-voltage device not being in the CV mode or responsive to determining that the external device is a relatively low-voltage device, activating a path of a circuit that directly connects a battery 189 of the electronic device 101 to the wireless charging IC 330 and supplying second power to the wireless charging IC 330 via the path.

The invention claimed is:

1. An electronic device comprising:
a first battery;
a wireless interface including a coil;
a wireless charging integrated circuit (IC) electrically connected to the coil;
a universal serial bus (USB) interface configured to be connected to a wired charging unit;
a first charger including a switching regulator;
a second charger including a switched-capacitor voltage divider; and
a processor,
wherein the processor is configured to:
while charging the first battery via the USB interface,
identify that a wireless power sharing function is performed such that the electronic device supplies wireless power to an external device including a second battery via the wireless interface;
identify, based on the performing of the wireless power sharing function, a charging state of the external device aligned with the coil;
in accordance with identifying that the charging state of the external device is a constant current (CC) mode, control the first charger to supply first power to the wireless charging IC, wherein the wireless charging IC provides a current to the coil based on the first power to supply wireless power to the external device; and
in accordance with identifying that the charging state of the external device is a constant voltage (CV) mode, activate a path that directly connects the first battery and the wireless charging IC and control to supply, via the path, second power lower than the first power to the wireless charging IC, wherein the wireless charging IC sources a current to the coil based on the second power to supply wireless power to the external device.

2. The electronic device of claim 1, further comprising:
a first switch configured to switch on or off an electrical connection between the USB interface and the first charger;
a second switch configured to switch on or off an electrical connection between the USB interface and the second charger;
a third switch configured to switch on or off an electrical connection between the first charger and the wireless charging IC; and
a fourth switch configured to switch on or off an electrical connection between the first battery and the wireless charging IC.

3. The electronic device of claim 2, wherein the processor is configured to activate the path by turning off the third switch and turning on the fourth switch.

4. The electronic device of claim 2, wherein the processor is configured to deactivate the path by turning on the third switch and turning off the fourth switch.

5. The electronic device of claim 1, wherein the processor is configured to:
activate the path based on the external device being a second device,
wherein the second device is a device that requests the reference voltage level in order to charge the second battery.

6. A method of an electronic device including a first battery, a wireless interface including a coil, a wireless charging integrated circuit (IC) electrically connected to the coil, a universal serial bus (USB) interface configured to be connected to a wired charging unit, a first charger including a switching regulator, and a second charger including a switched-capacitor voltage divider, the method comprising:
while charging the first battery via the USB interface,
identifying that a wireless power sharing function is performed such that the electronic device supplies wireless power to an external device including a second battery via a wireless interface;
identifying, based on the performing of the wireless power sharing function, a charging state of the external device aligned with the coil;
in accordance with identifying that the charging state of the external device is a constant current (CC) mode, controlling the first charger to supply first power to the wireless charging IC, wherein the wireless charging IC provides a current to the coil based on the first power to supply wireless power to the external device; and
in accordance with identifying that the charging state of the external device is a constant voltage (CV) mode, activating a path that directly connects the first battery and the wireless charging IC and control to supply, via the path, second power lower than the first power to the wireless charging IC, wherein the wireless charging IC sources a current to the coil based on the second power to supply wireless power to the external device.

7. The method of claim 6, wherein the electronic device comprises:
a first switch configured to switch on or off an electrical connection between a USB interface and a first charger;
a second switch configured to switch on or off an electrical connection between the USB interface and a second charger;
a third switch configured to switch on or off an electrical connection between the first charger and the wireless charging IC; and
a fourth switch configured to switch on or off an electrical connection between the first battery and the wireless charging IC.

8. The method of claim 7, wherein the activating of the path comprises turning off the third switch and turning on the fourth switch.

9. The method of claim 7, further comprising deactivating the path by turning on the third switch and turning off the fourth switch.

10. The method of claim 6, further comprising:
activating the path based on the external device being a second device,
wherein the second device is a device that requests the reference voltage level in order to charge the second battery.

* * * * *